United States Patent [19]

Matsumoto et al.

[11] Patent Number: 5,436,889
[45] Date of Patent: Jul. 25, 1995

[54] SYSTEM FOR MULTIPLEXED COMMUNICATION BETWEEN EXCHANGES

[75] Inventors: Teruyuki Matsumoto; Kansuke Kuroyanagi; Morihiko Kurata; Akihiro Kamiya, all of Yokohama, Japan

[73] Assignees: Hitachi Ltd.; Hitachi Software Engineering Co., Ltd., both of Tokyo, Japan

[21] Appl. No.: 5,176

[22] Filed: Jan. 15, 1993

Related U.S. Application Data

[63] Continuation of Ser. No. 551,440, Jul. 12, 1990, abandoned.

[30] Foreign Application Priority Data

Jul. 14, 1989 [JP] Japan .................... 1-180325

[51] Int. Cl.$^6$ .............. H04L 12/00; H04J 15/00; H04B 1/16
[52] U.S. Cl. ...................... 370/58.2; 370/79; 370/110.1; 370/112; 370/118
[58] Field of Search ............ 370/118, 109, 58.1, 370/58.2, 68.1, 110.1, 112, 79; 379/225; 348/384, 390; 381/29; 375/122

[56] References Cited

U.S. PATENT DOCUMENTS

| | | | |
|---|---|---|---|
| 4,661,974 | 4/1987 | Bales et al. | 379/225 |
| 4,823,342 | 4/1989 | Morita et al. | 370/109 |
| 5,014,266 | 5/1991 | Bales et al. | 370/110.1 |
| 5,031,211 | 7/1991 | Nagai et al. | 379/225 |
| 5,051,992 | 9/1991 | Taniguchi et al. | 370/110.1 |

FOREIGN PATENT DOCUMENTS 61-61543 3/1986 Japan .
62-183297 8/1987 Japan .

*Primary Examiner*—Hassan Kizou
*Attorney, Agent, or Firm*—Antonelli, Terry, Stout & Kraus

[57] ABSTRACT

A multiplexed communication system for automatically setting up a multiplexed call circuit between exchanges upon occurrence of a call only when the multiplexed call circuit is required while otherwise releasing the multiplexed call circuit. The multiplexed communication system includes a plurality of exchanges, each of which includes multiplexing/demultiplexing apparatus for compressing and multiplexing data inputted from first input/output to thereby output the compressed and multiplexed data to second input/output ports and for demultiplexing and expanding data inputted from the second input/output to thereby output the demultiplexed and expanded data to the first input/output port, control information messaging apparatus for messaging control information, first detection apparatus for detecting occurrence of a compressible call, and second detection apparatus for detecting that all the calls connected to the first input/output ports have been released. Upon detection of the compressible call by the first detection apparatus, a circuit is set up between the exchanges through the multiplexing/demultiplexing apparatus while the control information is transferred between the exchanges through the call control information messaging means, to thereby connect the call to the first input/output ports between the exchanges. When it is detected that all the calls connected to the first input/output ports have been released, the circuit between the exchanges is released.

4 Claims, 20 Drawing Sheets

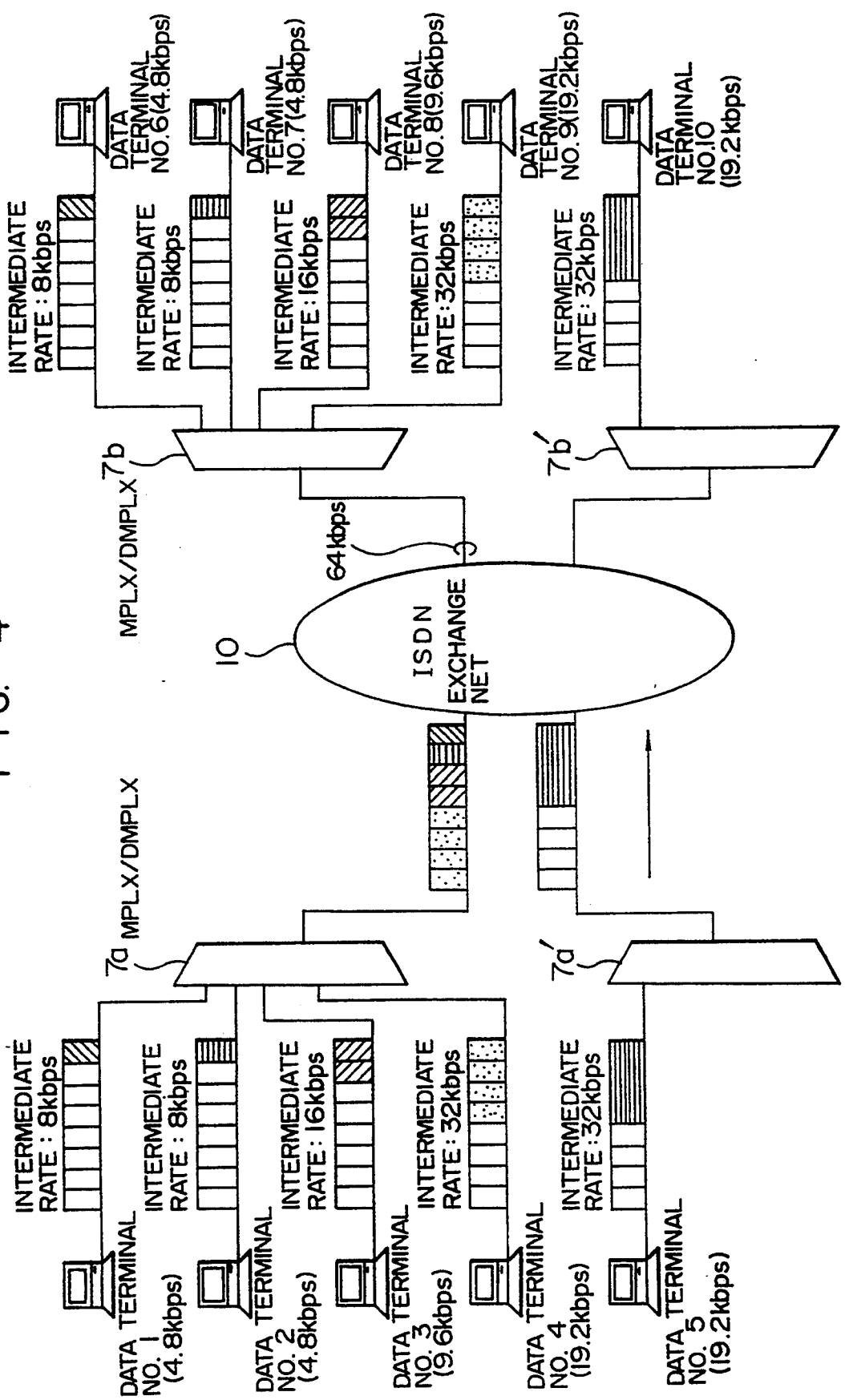
F I G. 4

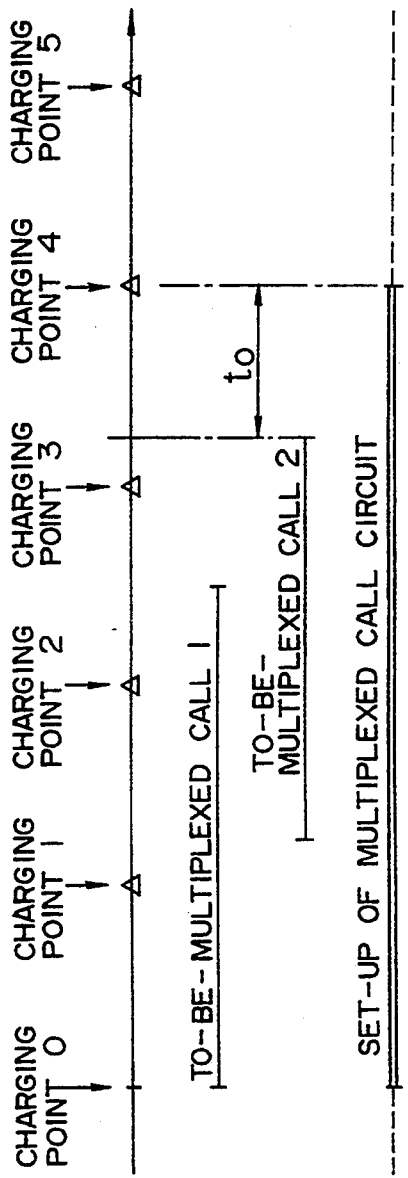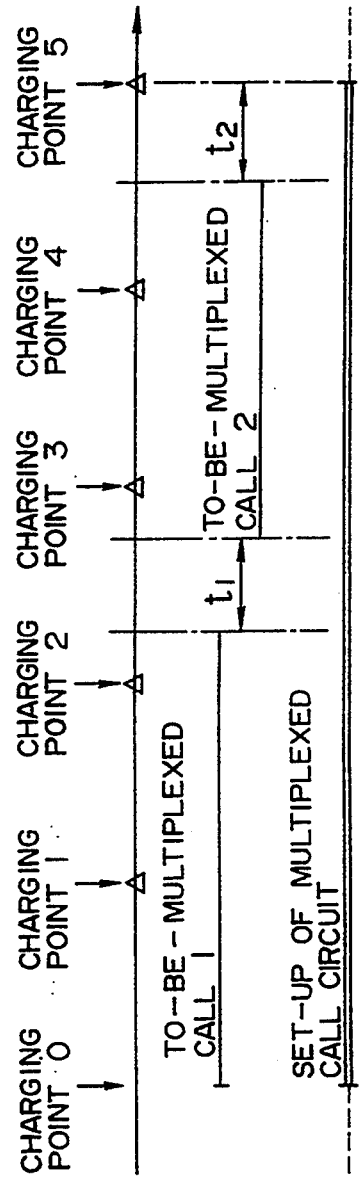

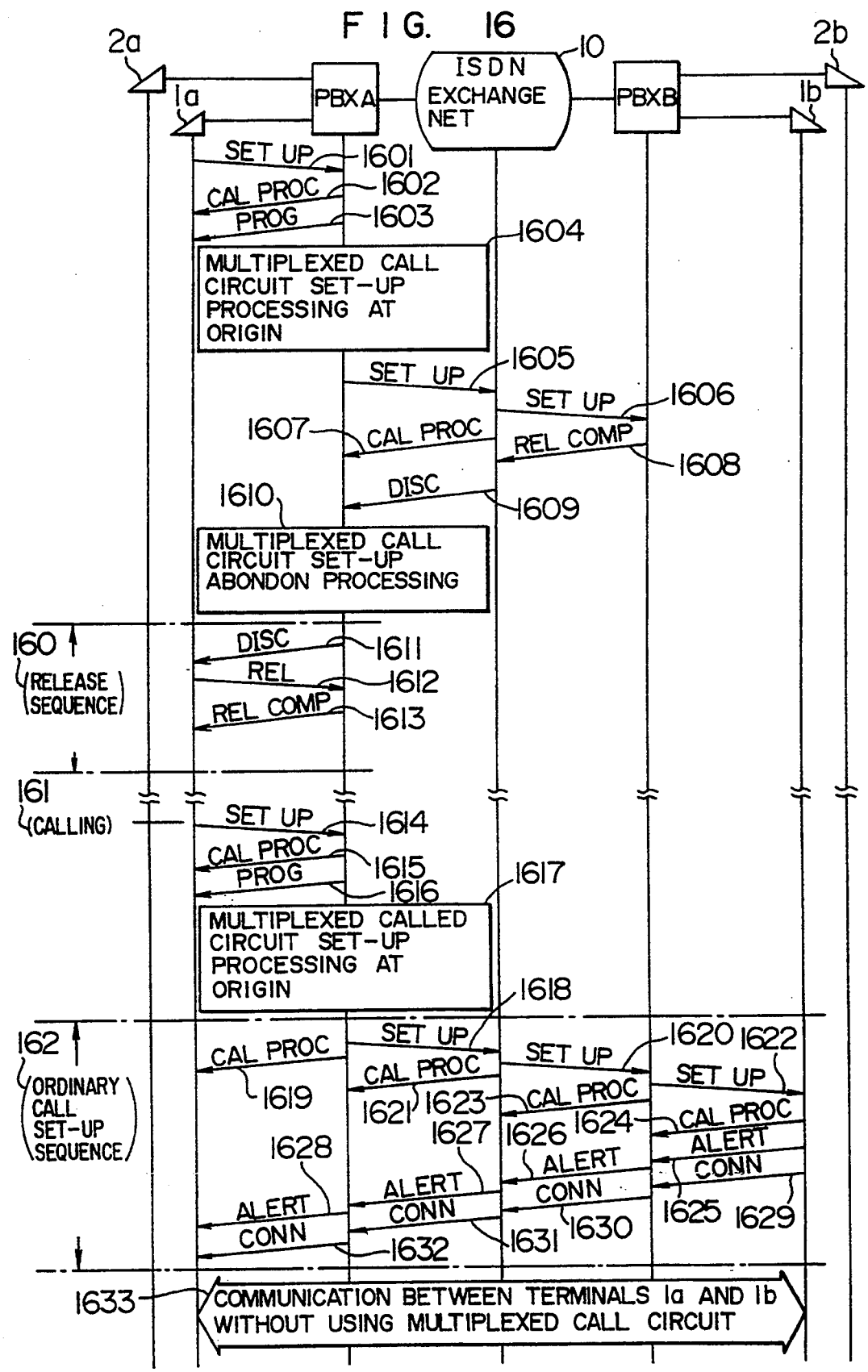

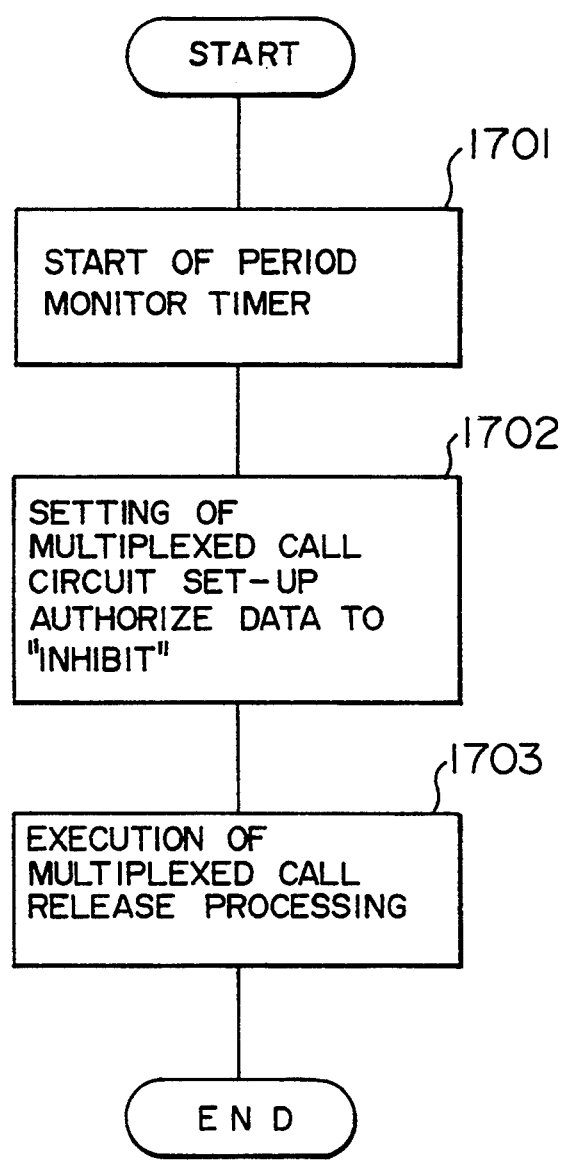
F I G. 17

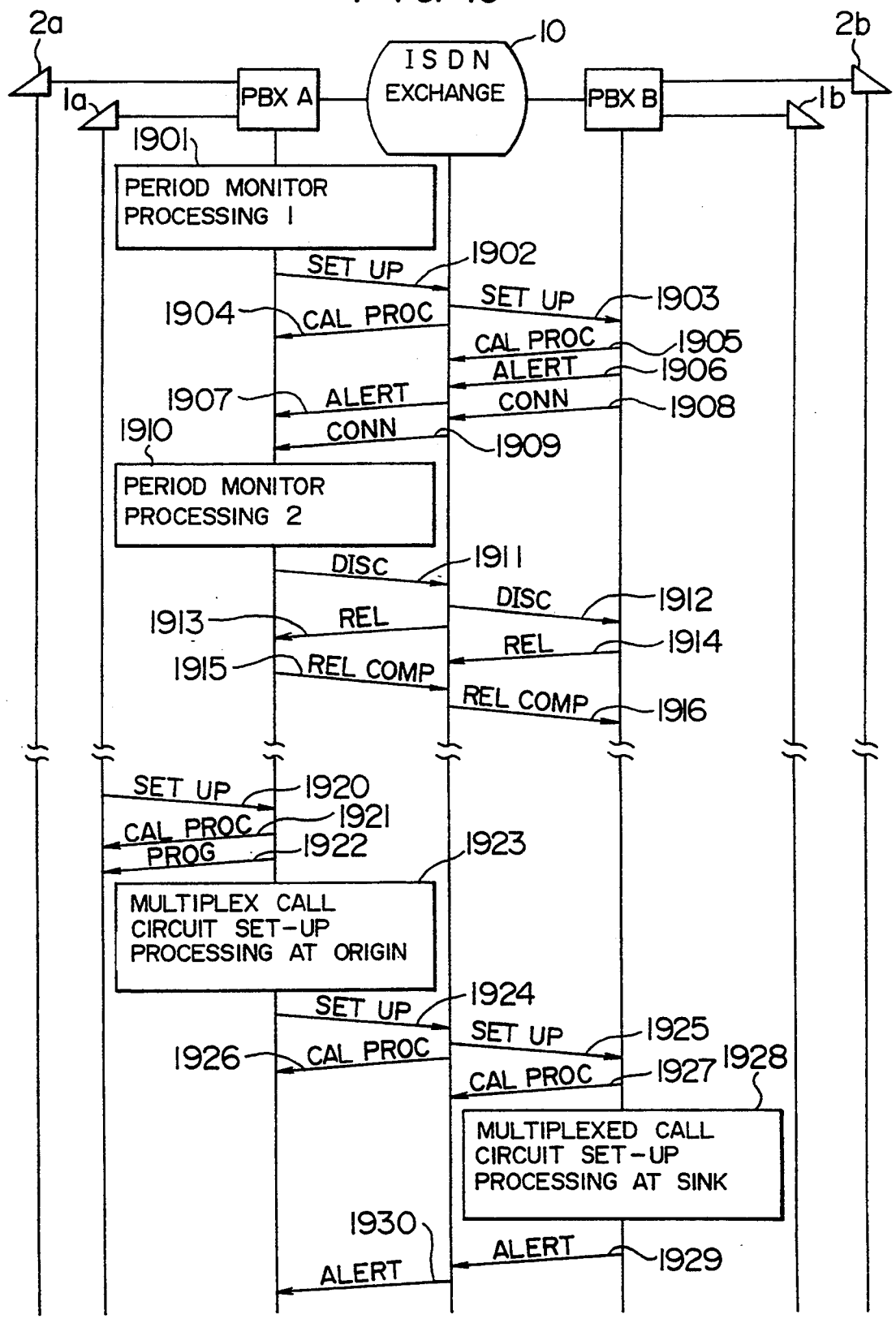
F I G. 19

PERIOD MONITOR
PROCESSING 1

PERIOD MONITOR
PROCESSING 2

SYSTEM FOR MULTIPLEXED COMMUNICATION BETWEEN EXCHANGES

This is a continuation of application Ser. No. 551,440, filed Jul. 12, 1990, now abandoned.

BACKGROUND OF THE INVENTION

1. Field of the Invention

The present invention relates generally to an interexchange multiplexed communication system for performing multiplexed communication between a plurality of exchanges. More particularly, the invention is concerned with a communication system suited advantageously for a call connection control between a pair of private branch exchanges each including a multiplexing/demultiplexing unit.

2. Description of the Related Art

With remarkable progress in the digital signal techniques in the recent years, it is now possible to carry out the ordinary voice telephone communication at a compressed transmission rate in a range of 8 to 32 kbps. In the communication between data terminals, a transmission rate on the order of several kbps tends to be employed increasingly. In contrast, in the case of an integrated services digital network (hereinafter referred to as the ISDN network), the minimum unit for the circuit switching is a 64-kbps data channel. Accordingly, when the ISDN network is used for the telephone and data communication there arises a large amount of waste.

In this conjunction, there is disclosed in JP-A-61-61543 (Japanese Patent Application Laid-Open No. 61543/1986) an interface system capable of accommodating simultaneously a voice terminal and a data terminal in a single subscriber's line in which a voice call and a data call are transmitted simultaneously at a rate of 64 kbps through multiplexed communication with a view to utilizing effectively the 64 kbps information channel. Further, as a system designed for effective channel utilization in the communication dedicated for digital data, there is proposed such a system in which compression/expansion rules are made to be dynamically controllable on a time-slot basis between an exchange and the counterpart therefor, as is disclosed in JP-A-62-183297.

However, in the case of the prior art systems mentioned above, no consideration is paid to the means for automatically releasing the multiplexed circuit between the private branch exchanges (also referred to simply as PBX) when no multiplexed call exists, as a result of which there arises a problem that when they are interconnected via a network where message rate is metered on a unit time basis, the charging may be made unreasonably. A second problem of the prior art system is seen in the fact that special protocol processing is required between the private branch exchanges in order to allocate the channel of a corresponding bearer rate to the call taking place.

SUMMARY OF THE INVENTION

It is an object of the present invention to provide a communication system which is capable of automatically setting up a multiplexed call circuit between exchanges only when it is necessary.

Another object of the present invention is to provide a communication system which is capable of releasing or clearing the multiplexed call circuit when it is unnecessary and this reducing the communication cost.

Still another object of the present invention is to provide a communication system in which compressing and multiplexing rules as well as expanding and demultiplexing rules are determined at the time when a multiplexed call circuit is set up, whereby any special protocol processing for channel allocation to calls to be connected between individual user's apparatus is rendered unnecessary.

In view of the first mentioned object, there is provided according to an aspect of the invention an exchange system which comprises multiplexing/demultiplexing means for compressing and multiplexing in accordance with predetermined conversion rules input data from a plurality of multiplexed ports connected exchangeably by channel switches and for demultiplexing and expanding input data from multiplexing ports by applying reversely the conversion rules to thereby output the demultiplexed and expanded data to the multiplexed ports, means for transferring call control information with a counterpart exchange, first detection means for detecting occurrence of a compressible call in the exchanges, and second detection means for detecting that the calls connected to the multiplexed ports have all been released. According to another aspect of the invention, the first mentioned object of the invention can also be achieved by incorporating additionally time measuring means in the exchange.

In view of the second mentioned object, it is proposed according to a further aspect of the present invention to incorporate in the exchanges the multiplexing/demultiplexing means whose compressing and expanding rules and multiplexing/demultiplexing methods are variable or changeable and means for messaging conversion rules currently adapted in the multiplexing/demultiplexing means.

When it is detected by the first detecting means that a compressible call takes place from one exchange to another exchange, a circuit is set up between the multiplexing ports of the exchanges. Besides, through the call information messaging means, the call is connected to the multiplexed ports. Any call occurring subsequently to the above-mentioned call which can be compressed in the circuit is equally connected to the multiplexed ports. The circuit between the multiplexing ports is released when it is detected by the second detection means that all the calls connected to the multiplexed ports have been released. Through the procedure described above, the circuit between the multiplexing ports of the exchanges is set up only when it is necessary while being cleared when unnecessary, whereby communication cost can be reduced.

In carrying out the invention in which the time measuring means is provided, time monitoring is started upon setting-up of the circuit between the multiplexing ports. When there exists a call connected to the multiplexed ports after lapse of a predetermined time, the time monitoring is started again, while the circuit between the multiplexing ports is released when there exists no calls connected to the multiplexed ports. By virtue of this aspect, cost for communication can be reduced by performing the period monitoring at a time interval not longer than a unit time for the charging when the exchanges are interconnected through an exchange network such as ISDN where the charging is performed at every lapse of the unit time.

Failure in the circuit connection between the multiplexing ports is considered to be abnormal in the case of the above-mentioned modes for carrying out the invention. Such situations can be handled as follows.

When the circuit fails to be connected between the multiplexing ports, the time monitoring is performed by the time measuring means. Besides, call connection is not made between the multiplexing ports even when compressible call takes place between the exchanges, but the call connection is made by using an alternate route. After lapse of a predetermined time, the circuit connection between the multiplexing ports is tried again. When the trial fails, the time monitoring is performed once again. On the other hand, when the trial succeeds in the circuit connection, call connection is realized by using the multiplexing/demultiplexing means for the compressible calls occurring subsequently between the exchanges. In this manner, in the abnormal situation, the call is connected without resorting to the use of the multiplexing/demultiplexing means but through an alternate route. After fault or trouble has been eliminated, the multiplexing/demultiplexing means can automatically be employed.

In a mode for carrying out the invention in view of the second mentioned object, the multiplexing/demultiplexing means those compression and expansion rules as well as multiplexing and demultiplexing methods are variable is employed, wherein upon setting-up of a call between the multiplexing ports, the conversion rule is messaged to the counterpart exchange to be established therein. By virtue of this feature, the protocol dedicated for messaging the conversion rules to the counterpart exchange upon setting-up of multiplexed calls is rendered unnecessary. The call connection can be realized by using simple signal such as those for start or activation, response, selection and the like.

BRIEF DESCRIPTION OF THE DRAWINGS

FIGS. 3 and 4 are views for illustrating the concept underlying the multiplexing/demultiplexing;

FIGS. 14 and 15 are diagrams for illustrating timings at which the multiplexed call circuit is released;

FIG. 16 is a view for illustrating a procedure for setting up a data call in the case where multiplexed call circuit can not be established;

FIG. 17 is a flow chart for illustrating a multiplexed call circuit set-up abandon processing involved in the procedure shown in FIG. 16;

FIG. 19 is a view for illustrating a period monitoring procedure;

DESCRIPTION OF THE PREFERRED EMBODIMENTS

The present invention will be described in detail in conjunction with preferred or exemplary embodiments thereof by reference to the drawings.

Figure 1:
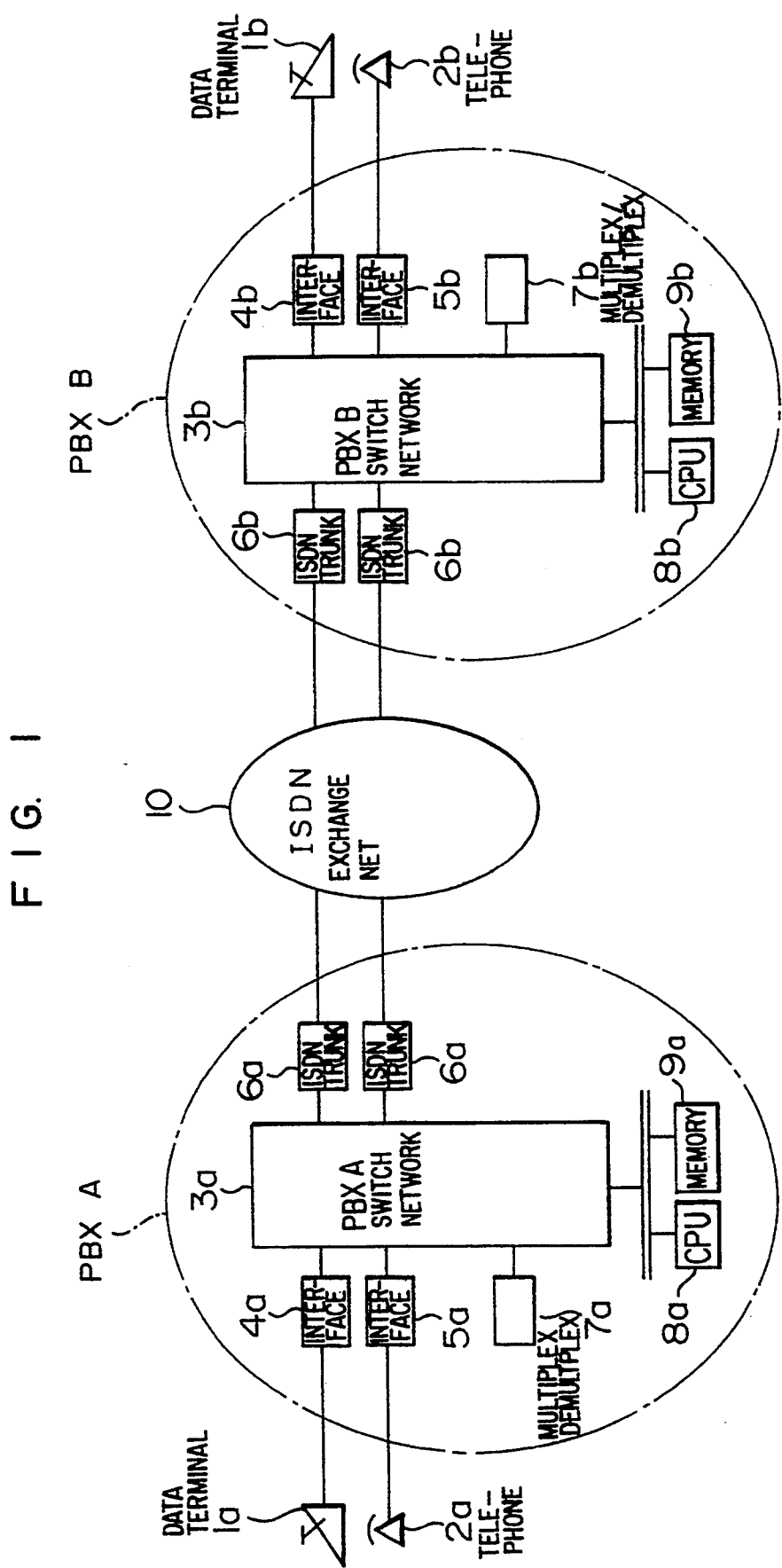
FIG. 1 is a diagram showing generally a system structure of an integrated services digital network or ISDN exchange network to which the present invention is applied.

FIG. 1 is a schematic diagram showing generally a structure of an ISDN exchange network system to which the present invention is applied. In FIG. 1, reference characters PBX A and PBX B denote private branch exchanges which accommodate therein data terminals 1a and 1b, respectively, each having a function for transmitting and receiving data in accordance with the intermediate rate adaptation rule stipulated in the CCITT Recommendation I. 463 and digital multi-function telephone sets 2a and 2b, respectively, for transmission/reception of voice calls of 64 kbps. The private branch exchanges PBX A and PBX B are constituted by switch networks 3a and 3b, respectively, data terminal interface devices 4a and 4b for interfacing the switch networks 3a and 3b with the data terminals 1a and 1b, respectively, digital telephone interface devices 5a and 5b for interfacing the digital multi-function telephone sets 2a and 2b with the switch networks 3a and 3b, respectively, ISDN trunks 6a and 6b for interfacing the ISDN exchange network with the switch networks 3a and 3b, respectively, multiplexing/demultiplexing units 7a and 7b (details of which will be described hereinafter), central processing units 8a and 8b for controlling the whole system of the private branch exchanges PBX A and PBX B, respectively, and main memories 9a and 9b to serve for storage of programs and as work areas used for the exchange control and for other purposes, respectively.

Figure 2:
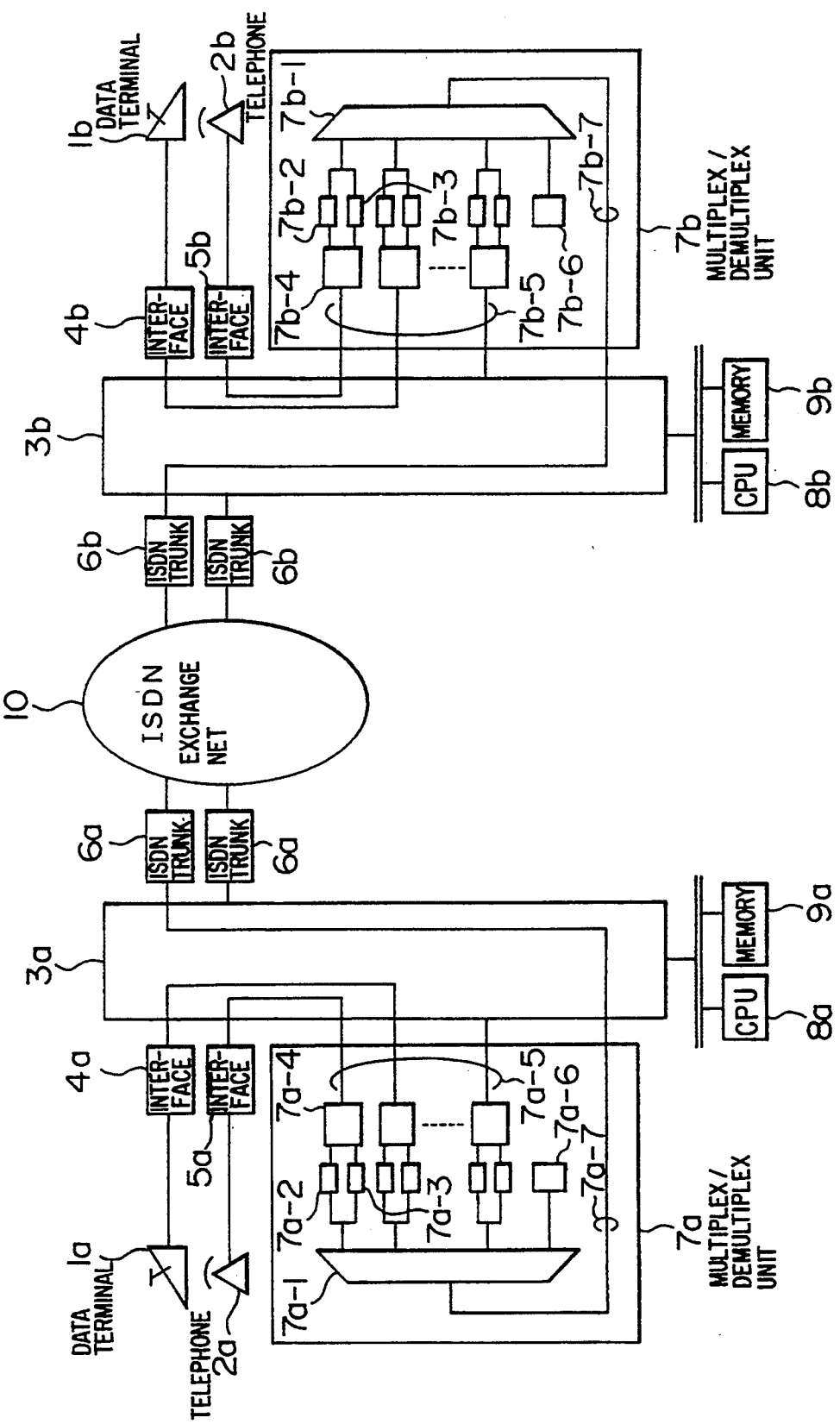
FIG. 2 is a schematic system diagram for illustrating the state in which communication is being conducted with calls being multiplexed.

Referring to FIG. 2, each of the multiplexing/demultiplexing units 7a and 7b has a function for multiplexing a plurality of input data calls and voice calls on a bus as well as a function for demultiplexing the calls multiplexed at 64 kbps into a plurality of data calls and voice calls. To this end, the multiplexing/demultiplexing unit 7a and 7b comprise multiplexing/demultiplexing circuits 7a-1 and 7b-1, bit extracting circuits 7a-2 and 7b-2, ADPCM circuits 7a-3 and 7b-3, selector circuits 7a-4 and 7b-4, multiplexed ports 7a-5 and 7b-5, call control information transmit/receive circuits 7a-6 and 7b-6 and multiplexing ports 7a-7 and 7b-7, respectively.

In the first place, description will be made of the operation for multiplexing a plurality of data calls and voice calls (hereinafter referred to as the calls to be multiplexed or as the to-be-multiplexed calls). When the calls to be multiplexed are inputted to the multiplexed ports 7a-5, the data calls are coupled to the bit extracting circuit 7a-2 with the voice calls being connected to the ADPCM circuit 7a-3 through the medium of the selector circuits 7a-4. In this conjunction, determination by the selector circuits 7a-4 as to which of the bit extracting circuit 7a-2 and the ADPCM circuit 7a-3 the to-be-multiplexed calls should be connected to is made for all the multiplexed ports 7a-5 at a time point when the multiplexed calls are set up between the private branch exchanges PBX A and PBX B by way of the ISDN exchange network 10. The bit extracting circuits 7a-2 extract from bit streams of the data calls inputted from the selector circuit 7a-4 the bits of user data portions which are then supplied to the multiplexing/demultiplexing circuit 7a-1. On the other hand, the ADPCM circuits 7a-3 compresses the transmission rate of 64 kbps of the voice call inputted through the selector circuits 7a-4 to the transmission rate of 32 kbps to be supplied to the multiplexing/demultiplexing circuit 7a-1. The call control information transmit/receive circuit 7a-6 serves for transaction with the central processing unit 8a of the control information for controlling the to-be-multiplexed calls and the multiplexed calls as the separate calls, respectively. The call control information transmit/receive circuit 7a-6 is connected to the multiplexing/demultiplexing circuit 7a-1. The outputs from the ADPCM circuits 7a-3 and the call control information transmit/receive circuit 7a-6 are multiplexed by the multiplexing/demultiplexing circuit 7a-1 on a single bus of 64 kbps to be outputted to the multiplexing ports 7a-7. The calls outputted from the multiplexing ports 7a-7 are outputted to the ISDN exchange network 10 through the switch network 3a and the ISDN trunk 6a.

In the called or destination private branch exchange PBX B, the multiplexed calls received from the ISDN exchange 10 through the ISDN trunk 6b and the switch network 3b are supplied to the multiplexing/demultiplexing unit 7b.

In the multiplexing/demultiplexing unit 7b, the demultiplexing operation is performed through the procedure reverse to that of the multiplexing operation described above. More specifically, the multiplexed calls inputted to the multiplexing ports 7b-7 are demultiplexed or separated to data calls or voice calls by the multiplexing/demultiplexing circuit 7b-1. The data calls resulting from the demultiplexing are inserted in the bit stream of 64 kbps through the bit extracting circuit 7b-2, while the voice data are expanded to the voice data of 64 kbps by the ADPCM circuit 7b-3 to be outputted to the multiplexed ports 7b-5 through the selector circuit 7b-4.

Figure 3:
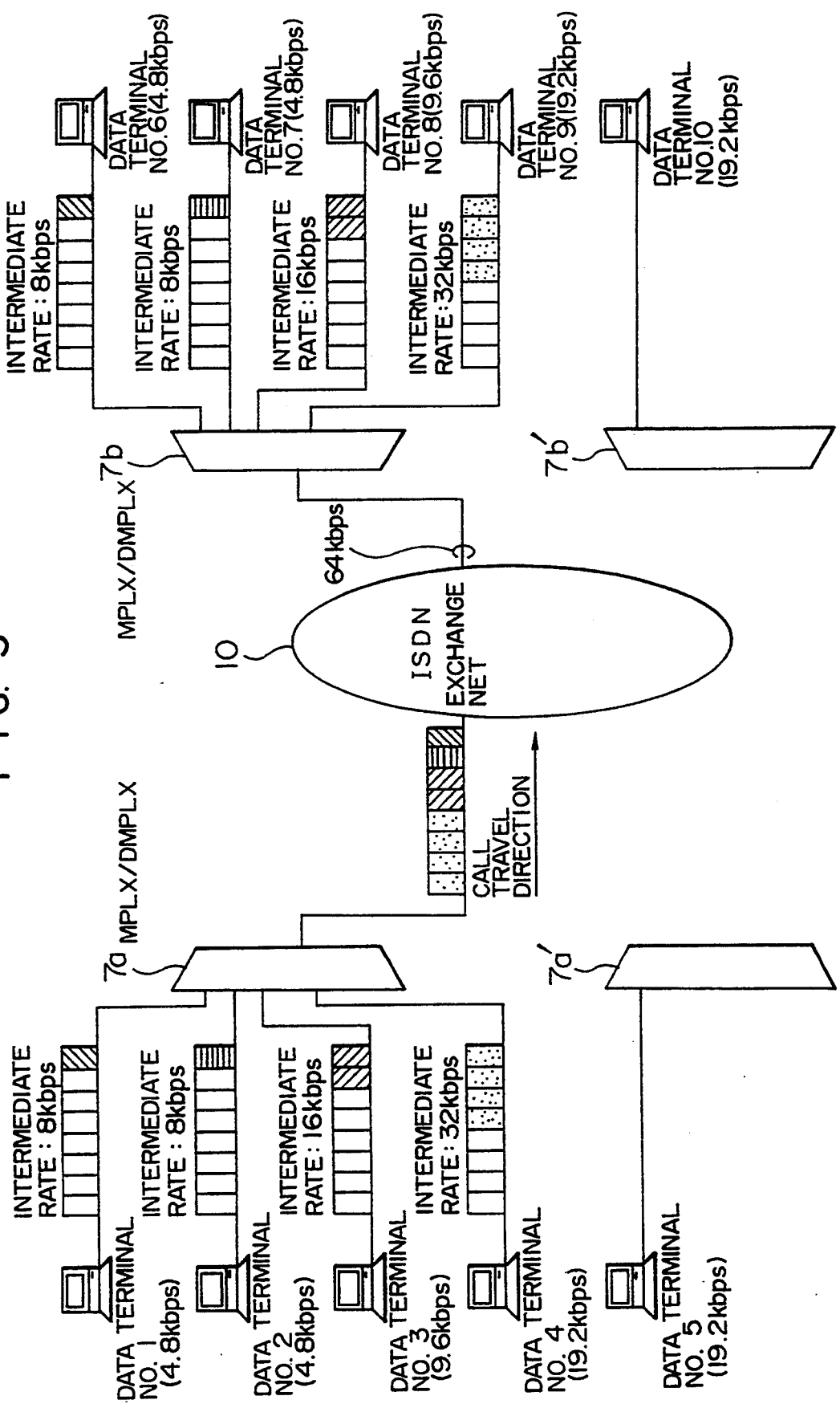

FIGS. 3 and 4 are views for illustrating conceptually in what manner the bits carrying the user data are multiplexed within each frame upon multiplexing of a plurality of calls.

Referring to FIG. 3, reference numerals 1 and 2 denote the data terminals for transmitting or sending data at a transmission rate of 4.8 kbps, while numerals 3 and 4 denote the data terminal for sending the data at the transmission rates of 9.6 kbps and 19.2 kbps, respectively. The data calls sent from the data terminals Nos. 1 and 2 are first converted to an intermediate transmission rate of 8 kbps to be subsequently supplied to the multiplexing/demultiplexing unit 7a. On the other hand, the data calls originating in the data terminals Nos. 3 and 4 are converted to intermediate transmission rates of 16 kbps and 32 kbps, respectively, to be subsequently inputted to the multiplexing/demultiplexing unit 7a. In the multiplexing/demultiplexing unit 7a, the data calls of the intermediate transmission rates inputted thereto are multiplexed into the bit stream of 64 kbps to be sent out to the ISDN exchange network 10. On the other hand, in the multiplexing/demultiplexing unit 7b in the called or destination private branch exchange PBX B, the bit stream of 64 kbps received through the ISDN exchange network 10 is demultiplexed into the individual data calls which then undergo the conversion to the intermediate rates of 8 kbps, 16 kbps and 32 kbps, respectively, to be subsequently supplied to the respective destination data terminals matched in respect to the rate.

FIG. 4 is a view for illustrating conceptually the situation in which the data call is newly issued from a data terminal No. 5 allocated with the transmission rate of 19.2 kbps, starting from the state illustrated in FIG. 3. Since the relevant circuit in the bus extending from the multiplexing/demultiplexing unit 7a is already occupied, the data from the data terminal No. 5 can not be multiplexed. When a new call which can not be multiplexed for the circuit already set up takes place, another multiplexing/demultiplexing unit (7a' in this case) sets up a circuit with the ISDN exchange network 10 to thereby enable the communication with the destination (sink) data terminal No. 10 through the multiplexing/demultiplexing unit newly put into operation.

Figure 5:
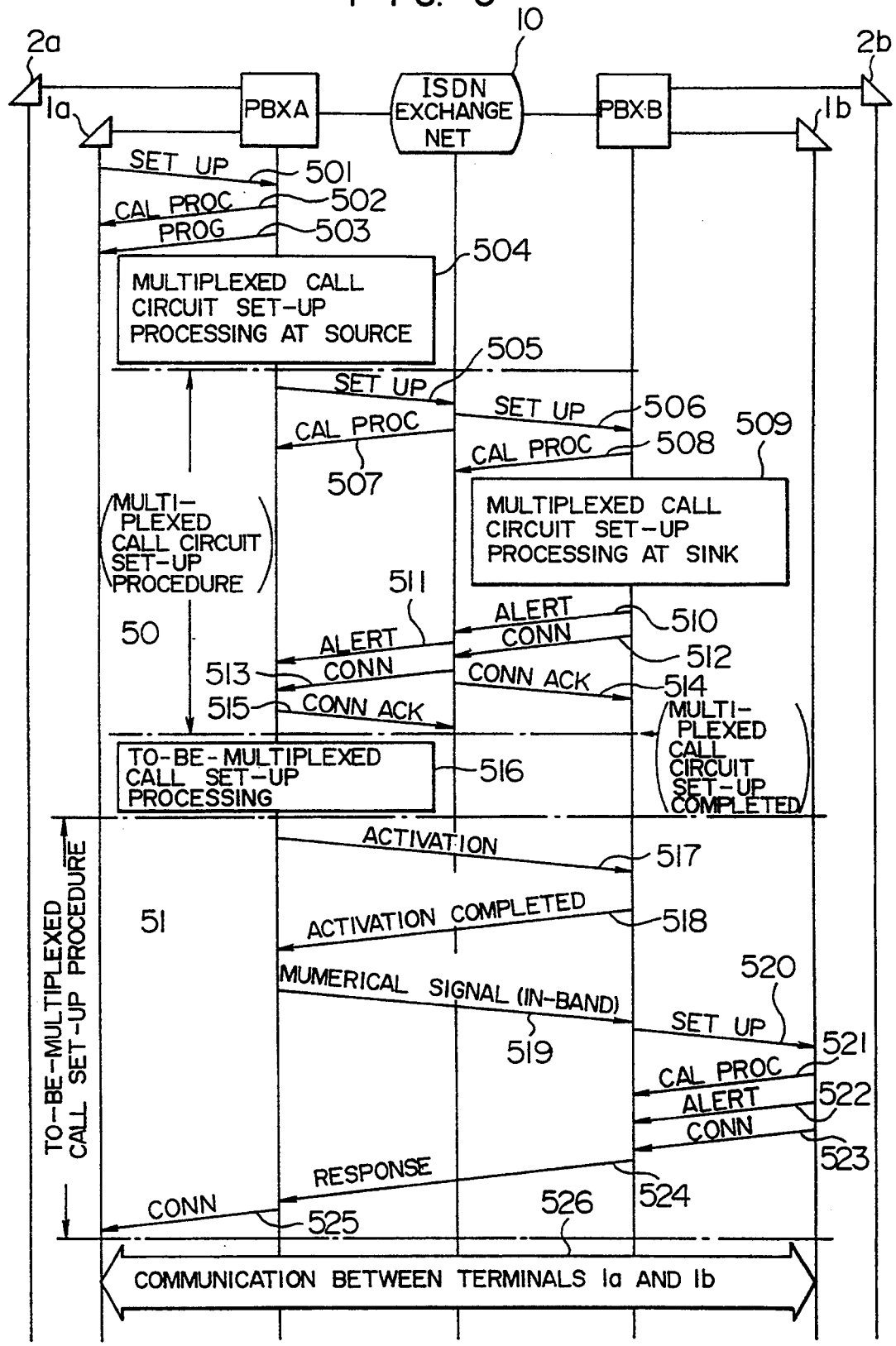
FIG. 5 is a diagram for illustrating a procedure involved in setting-up a call to be multiplexed (or to-be-multiplexed call) in the state where no multiplexed call circuit is yet established.

FIG. 5 is a view for illustrating a procedure for setting up a multiplexed call circuit together with a procedure for connecting the to-be-multiplexed call in the system of the structure shown in FIG. 1.

Being triggered by a first call occurring for the route to the private branch exchange PBX B from a terminal 1a accommodated in the PBX A as exemplified by a call set-up message (SET UP) 501 to a terminal 1b, a multiplexed call circuit set-up procedure 50 is activated. Upon completion of the setting-up of the circuit for the multiplexed calls between the private branch exchanges PBX A and PBX B through the ISDN exchange network 10, a to-be-multiplexed call set-up procedure 51 is activated by in-band information, whereby the to-be-multiplexed call is set up upon responding, for example, of the terminal 1b.

The procedures 50 and 51 for setting up the multiplexed call circuit and the to-be-multiplexed call, respectively, will now be described on the assumption that the call is issued to the terminal 1b, by way of example.

At first, a call set-up message (SET UP) 501 indicating a call connection request to the terminal 1b is sent out to the private branch exchange PBX A from the terminal 1a. Upon reception of the call set-up message 501, the private branch exchange PBX A sends out to the terminal 1a a call set-up processing in-progress message (CAL PROC) 502 and a progress indicating message (PROG) 503, whereon the central processing unit 8a (FIG. 1) executes a caller-side multiplexed call circuit set-up processing 504 (detail of which will be described later on). When it is decided as the result of execution of the caller-side multiplexed call circuit set-up processing 504 that the setting-up of the multiplexed call circuit is necessary, the private branch exchange PBX A sends a set-up message (SET UP) 505 to the ISDN exchange network 10. Upon reception of the set-up message (SET UP) 505 from the private branch exchange PBX A, the ISDN exchange network 10 sends out the call set-up processing in-progress message (hereinafter referred to as CAL PROC message) 507 to the private branch PBX A while sending out the set up message (SET UP) 506 to the private branch exchange PBX B. On the other hand, the private branch exchange PBX B receives the set-up message (SET UP) 506 from the ISDN exchange network 10 and recognizes the call set-up request to thereby send out the CAL PROC message 508 to the ISDN exchange network 10, while executing the destination-side multiplexed call circuit set-up processing 509 shown in FIG. 7 (detail of which will be described later on) by the central processing unit 8b shown in FIG. 1. After execution of the destination-side multiplexed call circuit set-up processing 509, the private branch exchange PBX B sends an alert message (ALERT) 510 and a response message message (CONN) 512 to the ISDN exchange network 10. Upon reception of the messages 510 and 512 from the private branch exchange PBX B, the ISDN exchange network 10 sends out the ALERT message 511 and the CONN message 513 to the private branch exchange PBX A while sending a connection acknowledgment (CONN ACK) message 515 to the ISDN exchange network 10. Through the procedure described above, there is set up the multiplexed call circuit between the private branch exchanges PBX A and PBX B via the ISDN exchange network 10. Once the multiplexed call circuit has been set up, the private branch exchanges PBX A and PBX B can perform communication without undergoing any influence from the ISDN exchange network 10, wherein the succeeding procedure is validated by the in-band information of the multiplexed call circuit.

Next, description will be turned to the procedure 51 for setting-up the to-be-multiplexed call.

Referring to FIG. 5, upon completion of the setting-up of the circuit for the multiplexed call, the private branch exchange PBX A executes a processing 516 for setting-up of the to-be-multiplexed call in accordance with processing flow illustrated in FIG. 8 (which will be described hereinafter in more detail), to thereby send out an activation message 517 to the private branch exchange PBX B which then responds to the reception of the activation message 517 by sending out an activation complete message 518 to the private branch exchange PBX A. Upon reception of the activation complete message 518 from the private branch exchange PBX B, the private branch exchange PBX A sends a numerical signal 519 to the PBX B. In response thereto, the private branch exchange PBX B decodes the message represented by the numerical signal 519 received from the PBX A, to thereby send a set-up message (SET UP) 520 to the destination (sink) terminal such as the terminal 1b. Upon reception of the set-up message (SET UP) 520, the terminal 1b sends out to the private branch exchange PBX B the CAL PROC message 521, the ALERT message 522 and the CONN message 523. Then, the private branch exchange PBX B recognizes the response of the destination terminal 1b upon reception of the CONN message and sends a response message 524 to the PBX A. Upon reception of the message 524, the PBX A recognizes the response from the terminal 1b to send the CONN message 525 to the caller terminal 1a to thereby enable communication 526 between the call-originating or caller terminal 1a and the destination or called terminal 1b.

Next, referring to a flow chart shown in FIG. 6, description will be made of the multiplexed call circuit set-up processing 504 to be performed on the side of the caller private branch exchange, for example, PBX A.

Figure 6:
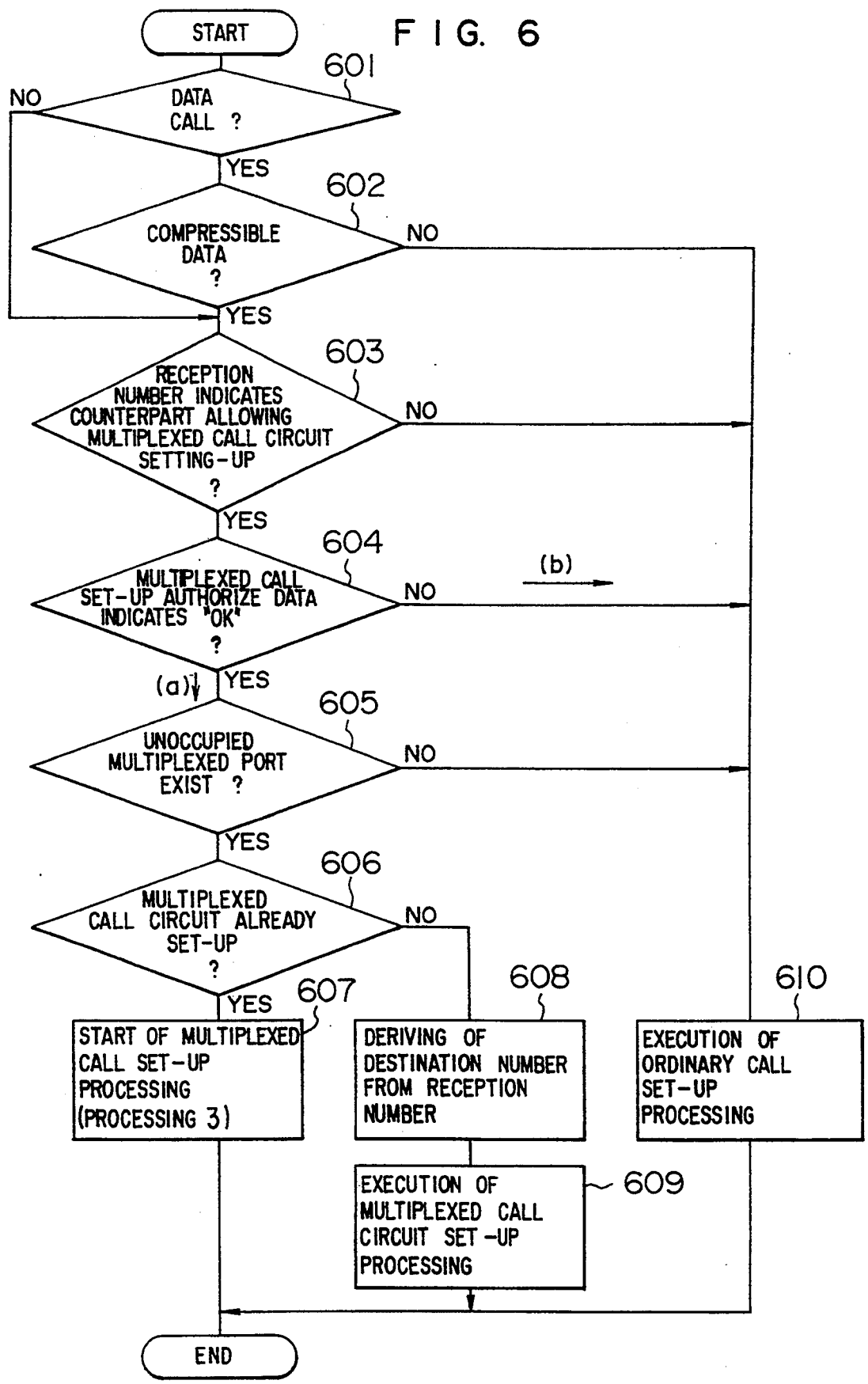
FIG. 6 is a flow chart for illustrating a multiplexed call circuit set-up processing to be performed on the side of the call originating exchange (PBX) or at origin in the state shown in FIG. 5.

At first, the private branch exchange PBX A reads the transfer capability and the low layer matchability from the content of the set-up message (SET UP) 501 received from the terminal 1a to decide whether the call is the data call or not (step 601 in FIG. 6) and, if so, then makes decision as to whether or not the data call can be compressed (step 602 in FIG. 6). In case the data call is insusceptible to the compression, the ordinary call set-up processing is executed (step 610 in FIG. 6). When the data call is decided to be compressible, the destination terminal identification number is read out to thereby decide on the basis of that number whether or not the destination (sink) exchange PBX B accommodates the multiplexing/demultiplexing unit (step 603 in FIG. 6). When the exchange of concern contains no multiplexing/demultiplexing unit, the ordinary call set-up processing is executed (step 610, FIG. 6). On the other hand, when it is decided that the destination exchange PBX B contains the multiplexing/demultiplexing unit, multiplexed call set-up authorization reference data (details of which will be described later on) is referred to (step 604, FIG. 6). When it is found as the result of consultation of the call set-up authorization reference data that the multiplexed call set-up is not authorized, the ordinary call set-up processing is executed (step 610, FIG. 6). On the contrary, when the multiplexed call set-up is authorized, access is made to the multiplexed ports for determining whether or not there are available any unoccupied ports (step 605, FIG. 6). When all the multiplexed ports are occupied, the ordinary call set-up processing is executed (step 610, FIG. 6). On the other hand, when there is available an unoccupied multiplexed port, then search is performed to determine whether or not the multiplexed call circuit has already been established (step 606, FIG. 6). If so, the to-be-multiplexed call set-up processing (details of which will be described hereinafter) is activated (step 607, FIG. 6), and otherwise the destination terminal identification number is extracted from the set-up message (SET UP) (step 608, FIG. 6), whereon the multiplexed call circuit set-up processing is executed (step 609 in FIG. 6).

Now, the multiplexed call circuit set-up processing 509 performed on the side of the destination private branch exchange (PBX B) will be described by reference to a flow chart shown in FIG. 7.

Figure 7:
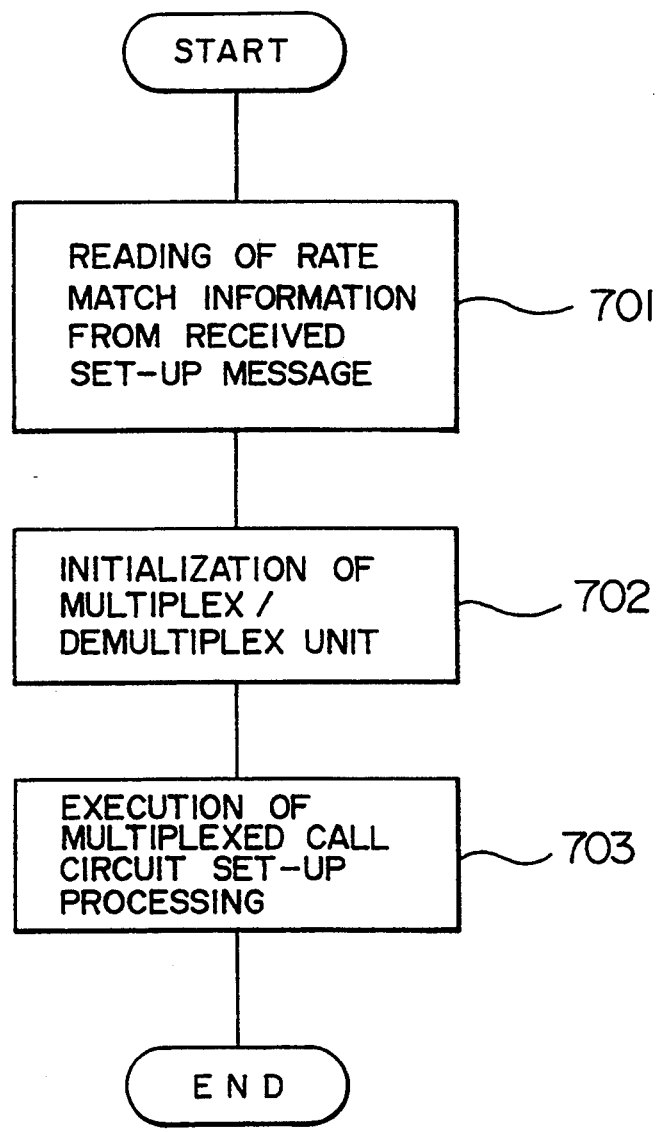
FIG. 7 is a flow chart for illustrating a multiplexed call circuit set-up processing to be performed on the side of a destination exchange (PBX) or at sink in the state shown in FIG. 5.

At first, in the private branch exchange PBX B, rate matching information such as the transfer capability, low-level layer matchability and the like is read out from the received set-up message (SET UP) (step 701 in FIG. 7), being followed by initialization of the multiplexing/demultiplexing unit (step 702, FIG. 7) for executing the multiplexed call circuit set-up processing (step 703 in FIG. 7).

Next, by referring to a flow chart shown in FIG. 8, the to-be-multiplexed call set-up processing 516 shown in FIG. 5 will be described in more detail.

Figure 8:
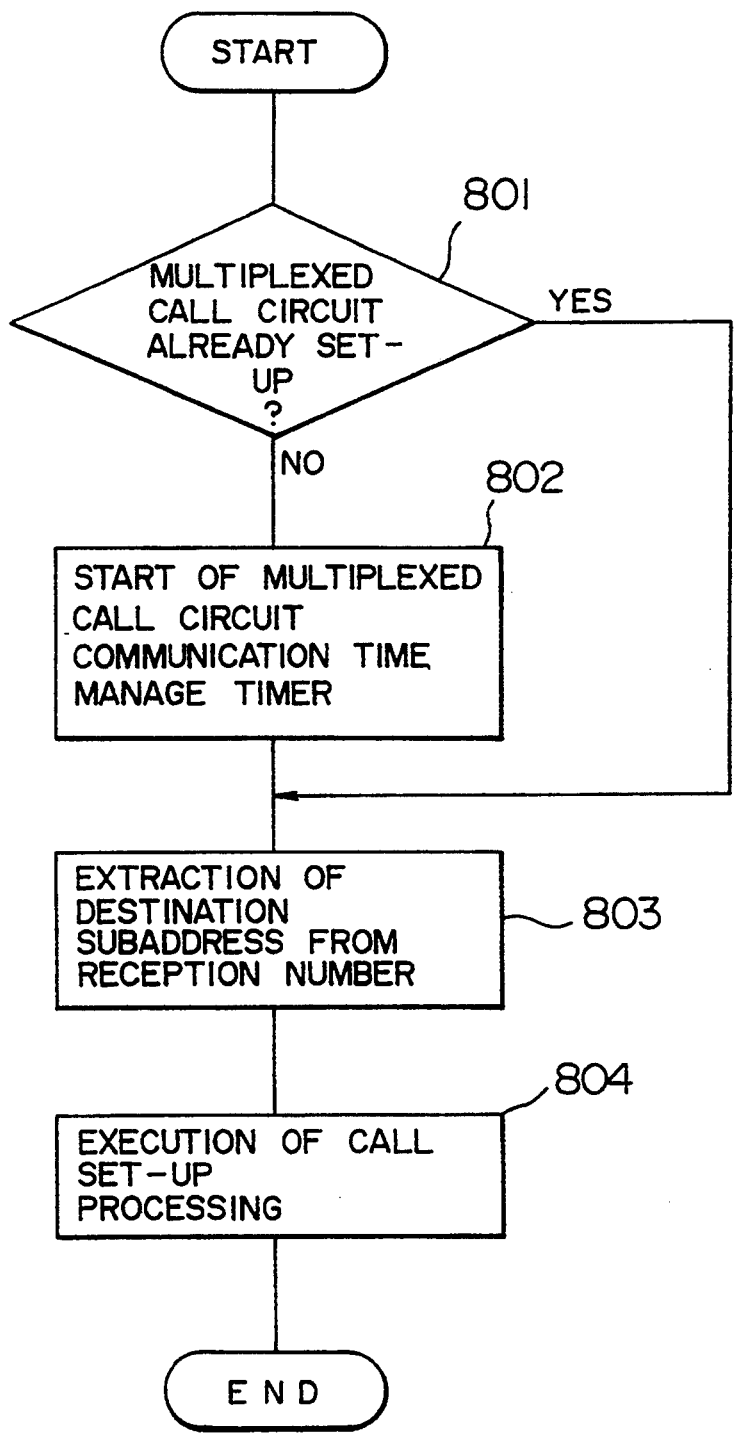
FIG. 8 is a flow chart for illustrating a to-be-multiplexed call set-up processing in the state shown in FIG. 5.

At first, in the private branch exchange A, decision is made as to whether or not the multiplexed call circuit has already been established (step 801, FIG. 8). Unless the multiplexed call circuit is yet established, a multiplexed call circuit communication time managing timer is activated (step 802, FIG. 8). On the contrary, when the multiplexed call circuit has already been established, the step 802 (FIG. 8) for activating the multiplexed call circuit communication time managing timer is skipped, and a destination sub-address, i.e. the number of an extension terminal accommodated in the private branch exchange PBX B is read out (step 803, FIG. 8) for executing the to-be-multiplexed call set-up processing (step 804, FIG. 8).

Figure 9:
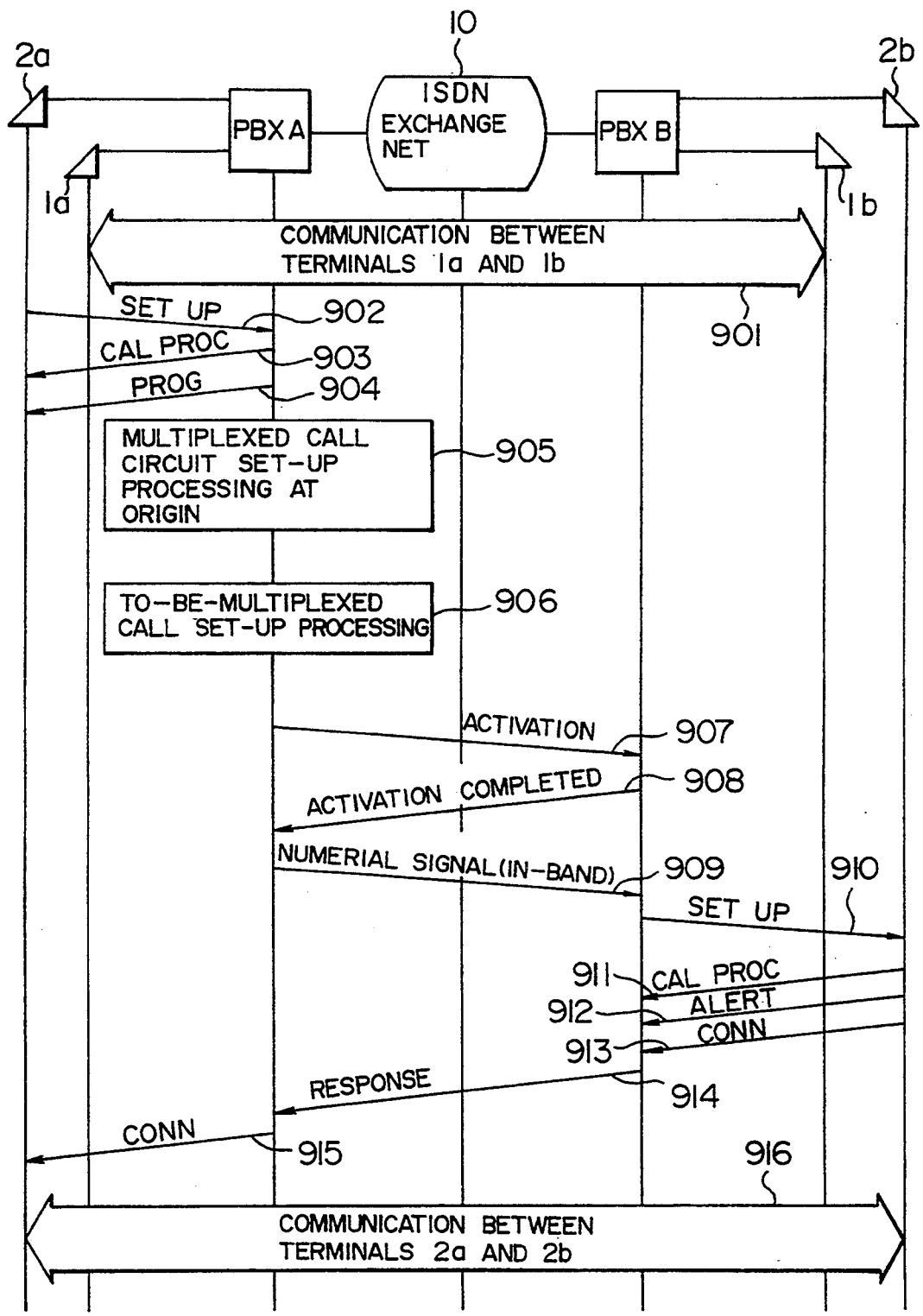
FIG. 9 is a view for illustrating a procedure for setting up a to-be-multiplexed call in the course of establishing a multiplexed call circuit.

FIG. 9 is a view for illustrating a procedure for the to-be-multiplexed call set-up processing which is to be executed in the case where a call is issued from a terminal 2a accommodated in the private branch exchange PBX A to a terminal 2b accommodated in the PBX B in the state in which the multiplexed call circuit has already been established between the private branch exchanges PBX A and PBX B. In this case, since the multiplexed call circuit has already been set up, the multiplexed call circuit set-up procedure 50 shown in FIG. 5 is skipped as the result of the decision made at the step 604 for the multiplexed call set-up processing performed on the caller side. Except for this, the procedure is same as that described hereinbefore in conjunction with FIG. 5.

Figure 10:
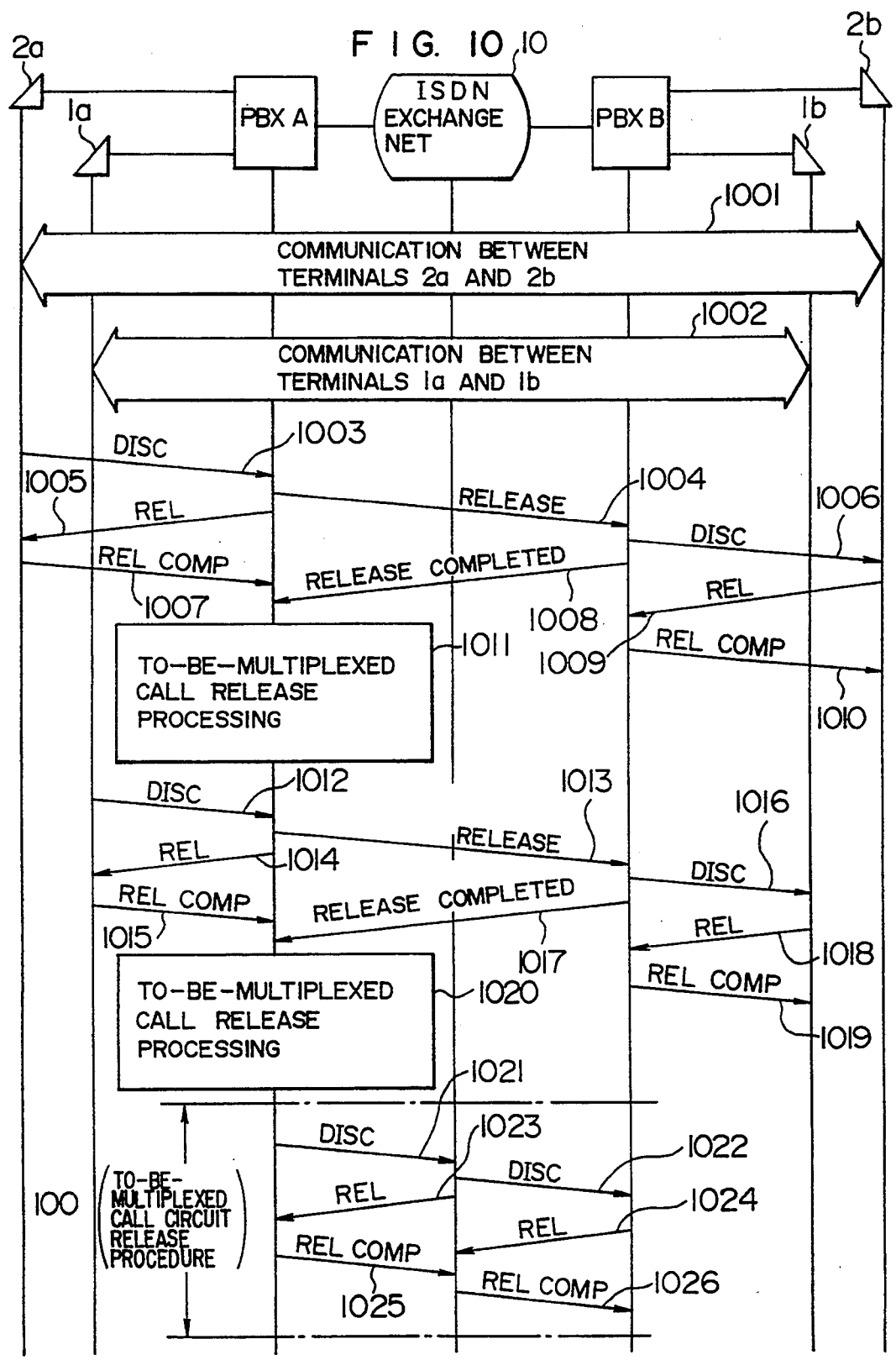
FIG. 10 is a view for illustrating procedures for releasing a to-be-multiplexed call and a multiplexed call circuit.

FIG. 10 is a view for illustrating a disconnect procedure for disconnecting one call in the state in which communication is being conducted for a plurality of multiplexed calls.

Let's assume that the terminal 2a sends out a disconnect message (DISC) 1003 to the private branch exchange PBX A. Upon reception of the DISC message 1003, the private branch exchange PBX A recognizes the multiplexed call disconnect message to thereby send out a release message 1004 in terms of the in-band information to the PBX B and at the same time send a release message (REL) 1005 to the terminal 2a. In response to the reception of the REL message 1005 from the PBX A, the terminal 2a sends a release complete message (REL COMP) 1007 to the PBX A. On the other hand, the private branch exchange PBX B responds to the reception of the release message 1004 from the PBX A by sending the DISC message 1006 to the terminal 2b while sending at the same time the release complete message 1008 to the PBX A. Upon reception of the DISC message 1006 from the PBX B, the terminal 2b sends back a REL message 1009 to the PBX B, whereon the PBX B sends the release complete message (REL COMP) 1010 to the terminal 2b. Thus, communication between the terminals 2a and 2b is disconnected. Subsequently, the PBX A performs a to-be-multiplexed call detect processing 1011 (details of which will be described later) for the purpose of making decision as to whether or not any other to-be-multiplexed call exists on the same multiplexed call circuit. At the time point corresponding to the state shown in FIG. 10, the multiplexed call circuit between the private branch exchanges PBX A and PBX B is retained as it is because communication is being conducted between the terminals 1a and 1b.

When the communication between the terminals 1a and 1b is disconnected through the procedure (1012–1019) which is similar to the aforementioned procedure (1003–1010), the private branch exchange PBX A executes again the to-be-multiplexed call release processing 1020. Since any other to-be-multiplexed call does not exist on the same multiplexed call circuit, the private branch exchange PBX A performs in succession the multiplexed call circuit release processing.

Next, description will be directed to the multiplexed call circuit release procedure 100. At first, the private branch exchange PBX A sends a disconnect message (DISC) 1021 to the ISDN exchange network 10. Subsequently, the ISDN exchange network 10 sends the DISC message 1022 to the PBX B while sending a release message (REL) 1023 to the PBX A. On the other hand, the PBX B sends out a REL message 1024 to the ISDN exchange network 10. Further, the private branch exchange PBX A sends out the release complete message (REL COMP) 1025 to the ISDN exchange network 10, while the latter sends the REL COMP message 1026 to the private branch exchange PBX B, as a result of which the multiplexed call circuit between the private branch exchanges PBX A and PBX B is cleared.

Figure 11:
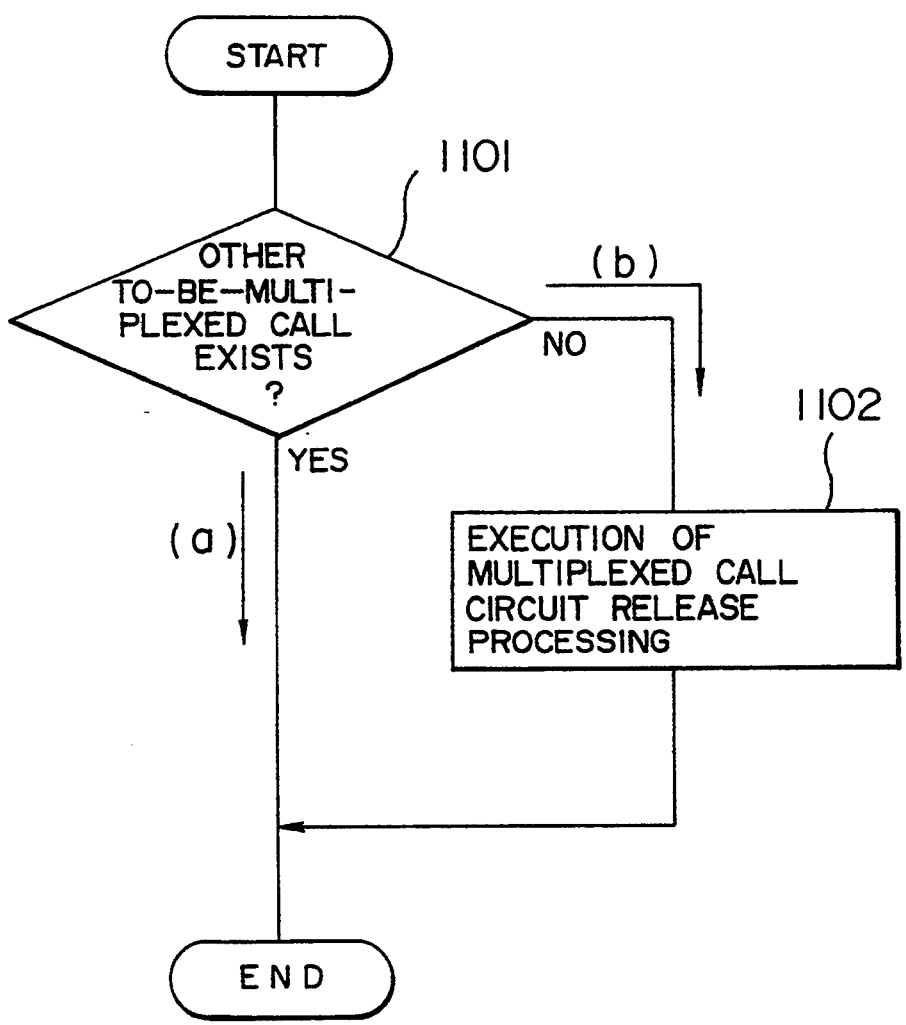
FIG. 11 is a flow chart for illustrating a to-be-multiplexed call releasing or clearing processing involved in the procedures shown in FIG. 10.

FIG. 11 shows in a flow chart for illustrating in more detail the to-be-multiplexed call release processing (1011, 1020) shown in FIG. 10.

The private branch exchange PBX A makes decision by detection as to whether or not any other to-be-multiplexed call exists on the same multiplexed call circuit (step 1101 in FIG. 11). If it is present, the procedure is terminated without doing anything, and otherwise the multiplexed call circuit release processing is executed (step 1102 in FIG. 11).

Figure 12:
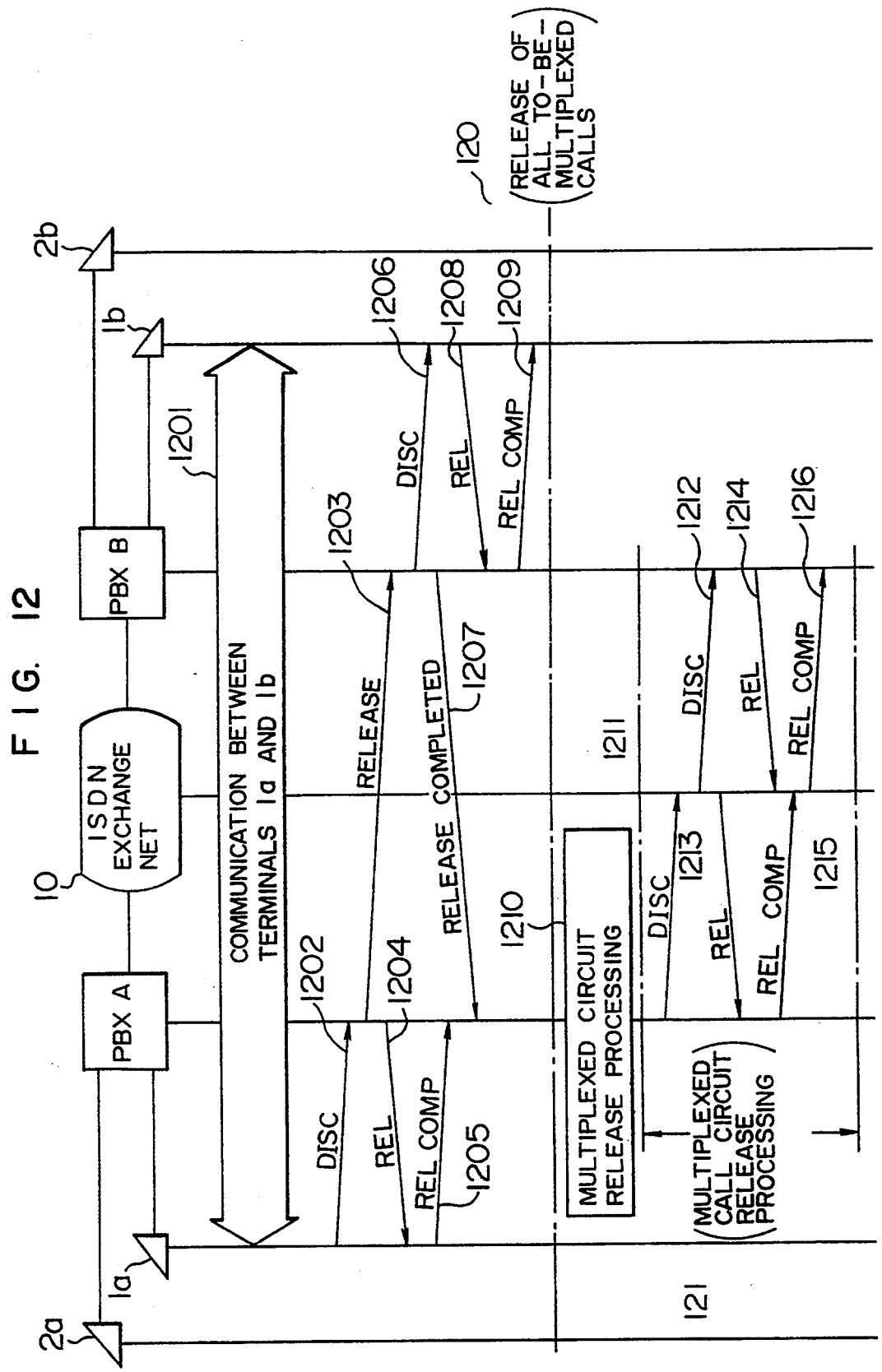
FIG. 12 is a view for illustrating a procedure for releasing a multiplexed call circuit in the case where a multiplexed call circuit communication time managing timer is employed.

Next, by referring to FIG. 12, description will be made of procedure for releasing the multiplexed call circuit by using the multiplexed call circuit communication time manage timer. In FIG. 12, the sequence in which all the to-be-multiplexed calls are released is similar to that involved in the to-be-multiplexed call release processing described hereinbefore in conjunction with FIG. 10. At a time point (120) when all the to-be-multiplexed calls in the multiplexed call circuit are released, the private branch exchange PBX A executes a multiplexed call circuit release processing 1210 to thereby determine the timing at which the multiplexed call circuit is to be released.

Figure 13:
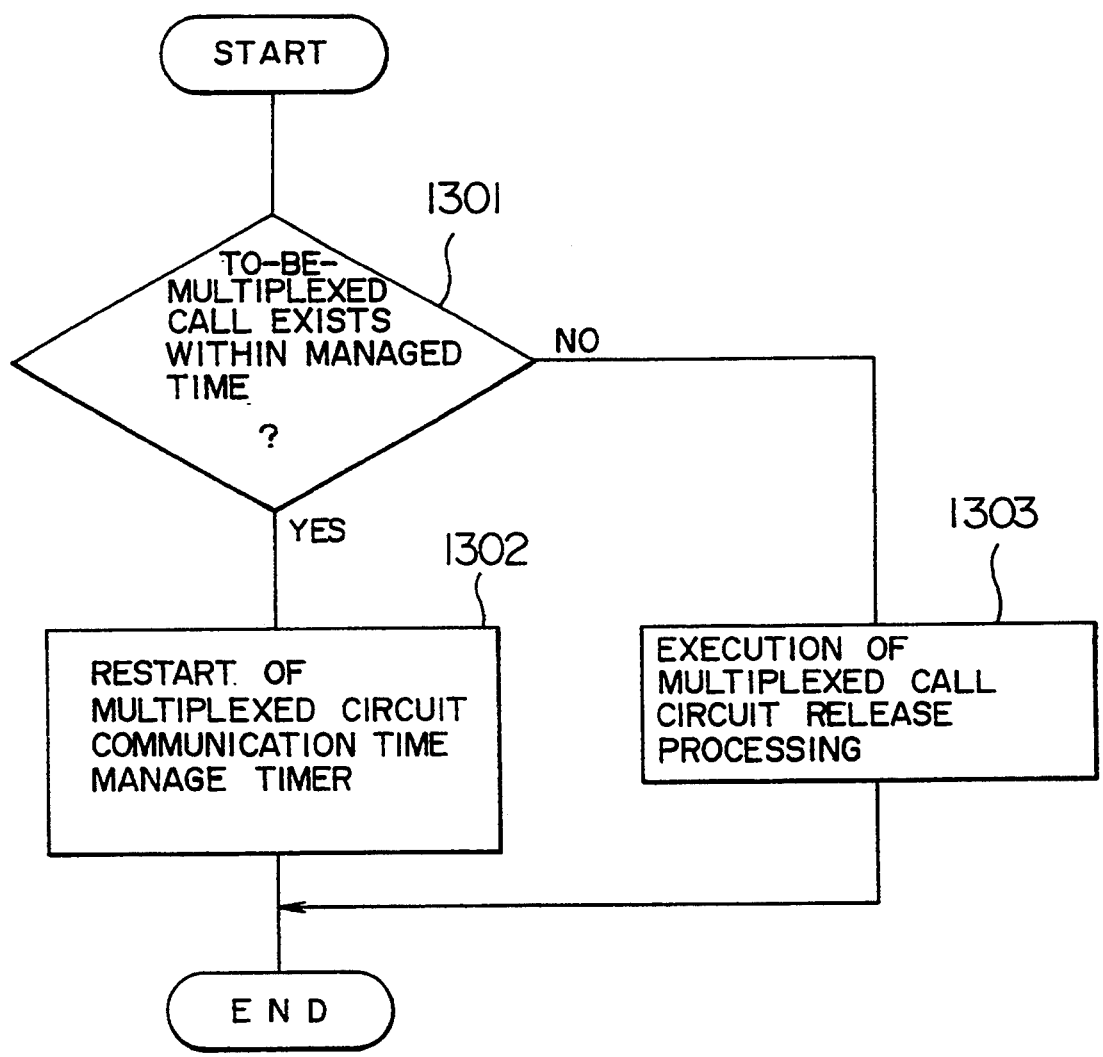
FIG. 13 is a flow chart for illustrating a multiplexed call circuit releasing processing involved in the procedure shown in FIG. 12.

The multiplexed call release processing 1210 is executed in accordance with the processing flow illustrated in FIG. 13. At first, the concept of the communication time management will be elucidated with the aid of FIGS. 14 and 15. Referring to FIG. 14, when a given to-be-multiplexed call (call 1) is set up, the private branch exchange starts execution of a charging processing (charging point "0"). The charging is made in proportion to the communication duration and incremented generally at every predetermined time interval. When a to-be-multiplexed call 2 takes place in the course of communication for the to-be-multiplexed call 1 which call 2 can make use of the same circuit as the call 1, the former (call 2) is accommodated on the same to-be-multiplexed call circuit to thereby allow communication. In this state, even when the communication for the to-be-multiplexed call has been completed, the multiplexed call circuit is retained in the state set up because communication is being conducted for the to-be-multiplexed call 2. On the other hand, when the communication for the to-be-multiplexed call 2 has been completed, the to-be-multiplexed call 2 is released, whereon the circuit is made to remain in the set-up state till the time set up immediately before the next charging point (charging point 4) for monitoring if any other to-be-multiplexed call capable of being accommodated on the same circuit takes place. FIG. 14 illustrates, by way of example, the case in which the to-be-multiplexed call capable of being accommodated on the same circuit is not detected as the result of the monitoring. In this case, the multiplexed call circuit is released immediately before the next charging point (charging point 4).

Referring to FIG. 15, when the communication for the to-be-multiplexed call 1 has been completed through the multiplexed call circuit set up therefor, then it is monitored till the next charging point (charging point 3) if any other to-be-multiplexed call takes place which can be accommodated in the same multiplexed call circuit, as described above by reference to FIG. 14. When the monitoring results in detection of a to-be-multiplexed call (to-be-multiplexed call 2) capable of being accommodated in the same multiplexed call circuit, that call 2 is accommodated in the multiplexed call circuit being currently set up, to thereby allow the communication for the call 2. The multiplexed call release procedure shown in the flow chart of FIG. 13 is to carry out the processing described above. At first, it is decided at a step 1301 shown in FIG. 13 whether or not any to-be-multiplexed call is present in the multiplexed call circuit within a time for management (immediately before the charging point). When the call exists the management timer is reactivated (step 1302, FIG. 13) and if otherwise, the multiplexed call circuit is released (step 1303, FIG. 13).

Next, description will be directed to a processing procedure for coping with such situation in which the multiplexed call circuit can not be set up due to fault or trouble in the ISDN exchange network 10 or mismatch in the transmission rate between the call-originating (source) multiplexing/demultiplexing unit 7a and the call-destination (sink) multiplexing/demultiplexing unit 7b.

FIG. 16 shows a sequence diagram for illustrating a call set-up procedure in the case where the multiplex call circuit can not be set up. It is assumed that the private branch exchange PBX A detects the set-up message (SET UP) 1601 from the terminal 1a. When it is recognized that the destination is the private branch exchange PBX B, the PBX A sends to the terminal CAL PROC message 1602 and the PROG message 1603. Subsequently, the caller-side multiplexed call circuit set-up processing 1604 illustrated in FIG. 6 is executed for deciding at a step 604 whether the set-up of the multiplexed call circuit is possible or not. When it is detected that the multiplexed call circuit can be set up, a set-up message (SET UP) 1605 is sent to the ISDN exchange network 10. To the contrary, when a DISC message 1609 is received from the ISDN exchange network 10 due to some trouble, the PBX A performs a multiplexed call circuit set-up abandon processing 1610 shown in FIG. 17, whereby the processing for releasing the terminal 1a is executed in accordance with the sequence diagram (step 160). Subsequently, when there occurs a call to the PBX B (reception of the SET UP message at 1614), it is recognized that the multiplexed call circuit set-up is impossible as the result of the multiplexed call circuit set-up processing executed on the side of the caller (step 604 in FIG. 6). Thus, the ordinary call set-up sequence is executed (step 605 in FIG. 6). Parenthetically, the ordinary call set-up sequence (162) is executed through the procedure (1618-1632) shown in FIG. 16, as the result of which communication state is established between the terminals 1a and 1b (step 1633).

FIG. 17 is a flow chart for illustrating in more detail the multiplexed call circuit set-up abandon processing shown in FIG. 16. When the multiplexed call circuit could not be set up, as described above, a periodical monitor timer is activated for checking or testing periodically whether the multiplexed call circuit can be set up or not (step 1701 in FIG. 17). Subsequently, a multiplexed call circuit set-up unauthorize data is validated for unauthorizing the multiplexing/demultiplexing units 7a and 7b from being used until the state is attained which allows the multiplexed call circuit to be set up (step 1702, FIG. 17), whereon the to-be-multiplexed call release processing is performed for the calling terminal (step 1703, FIG. 17).

Figure 18:
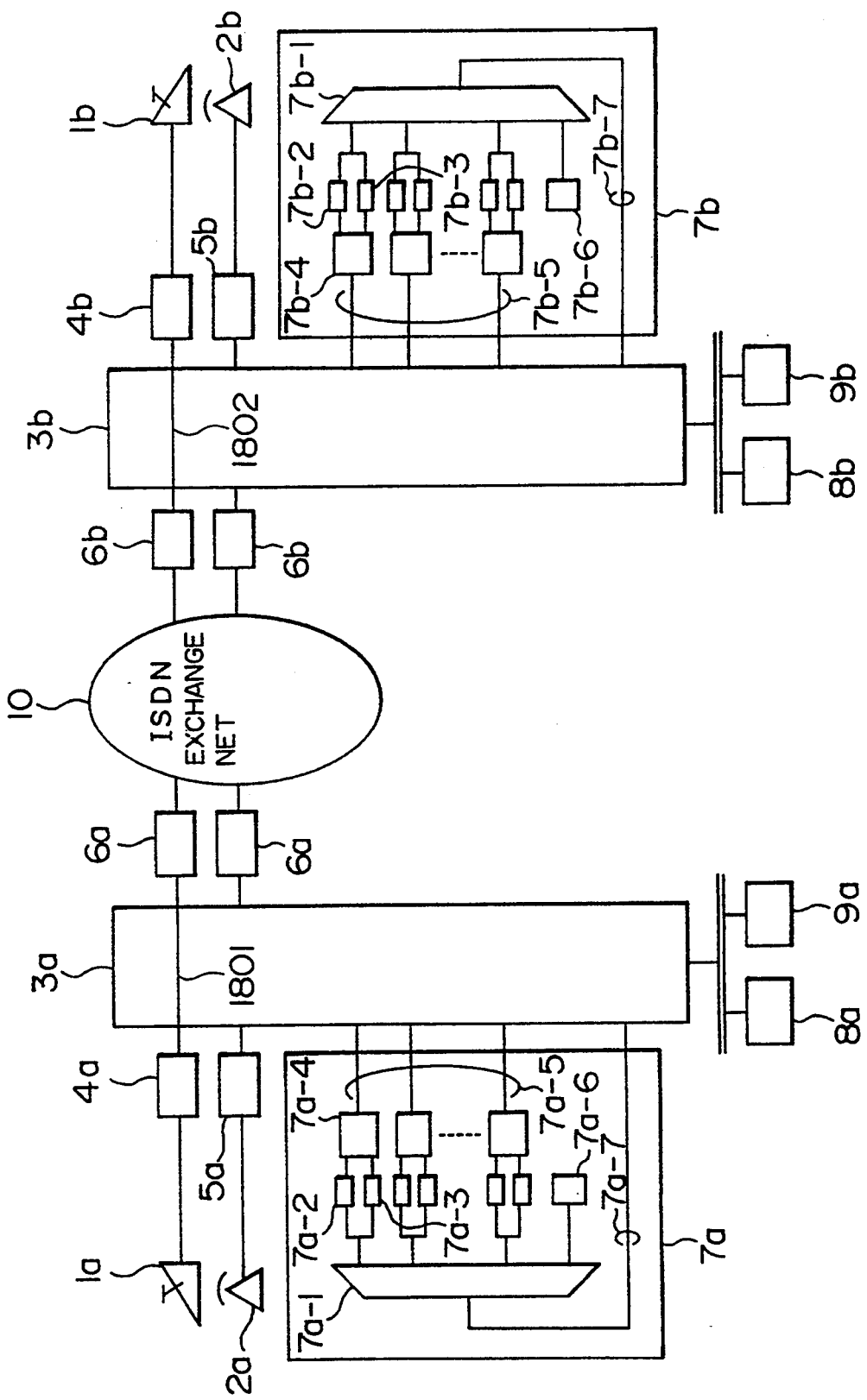
FIG. 18 is diagram showing a call communication state in the case there the multiplexed call circuit could not be established.

FIG. 18 is a view showing the state in which communication is conducted in accordance with the ordinary call set-up sequence because of incapability of setting up the multiplexed call circuit. As can be seen, communication is conducted via the routes 1801 and 1802 by circumventing the multiplexing/demultiplexing units 7a and 7b.

Now, description will be made of the processing procedure for the periodical monitor timer mentioned above. The period monitoring timer is activated at a step 1701 of the multiplexed call circuit set-up abandon processing shown in FIG. 17. When the period set at the period monitoring timer has expired, processing is performed in accordance with a period monitoring sequence shown in FIG. 19. At first, through the period monitoring sequence 1 (1901) (details of which will be described later), it is tested whether the multiplexed call circuit can now be set up or not. To this end, the private branch exchange PBX A automatically sends a trial call set-up message (1902, 1903) to the PBX B via the ISDN exchange network 10 for deciding whether the multiplexed call circuit can be set up or not. If not, the activation of the periodical monitor timer up to the expiration and reactivation of the trial call set-up message are repeated. When a CONN message 1909 is received from the ISDN exchange network 10 through a series of steps shown in FIG. 19, indicating that the multiplexed call circuit for the trial or test purpose has been set up, then a period monitoring processing 2 (1910) (details of which will be described hereinafter) is executed, whereon the trial multiplexed call circuit release processing is executed, as shown in FIG. 19 (1911-1916). Subsequently, the call issued from the private branch exchange PBX A to the PBX B is processed through the multiplexed call circuit via the multiplexing/demultiplexing units 7a and 7b in accordance with the procedure (1920-1930) which is similar to that shown in FIG. 5.

Figure 20:
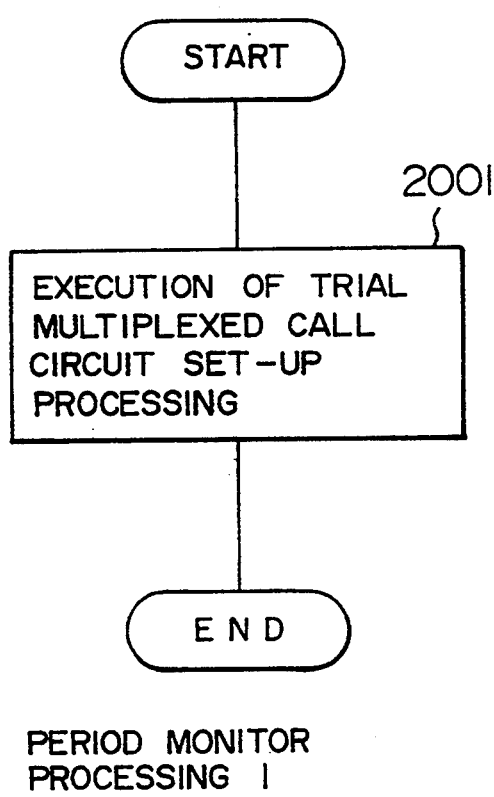
FIG. 20 is a flow chart for illustrating a period monitoring processing (1) involved in the procedure shown in FIG. 19.

FIG. 20 is a flow chart illustrating in detail the period monitoring processing 1 (1901) shown in FIG. 19. Upon expiration of the period set at the period monitoring timer, decision is made as to whether the multiplexed call circuit can be set up or not, as described previously. To this end, a command is issued for performing the trial multiplexed call circuit set-up processing (2001, FIG. 20).

Figure 21:
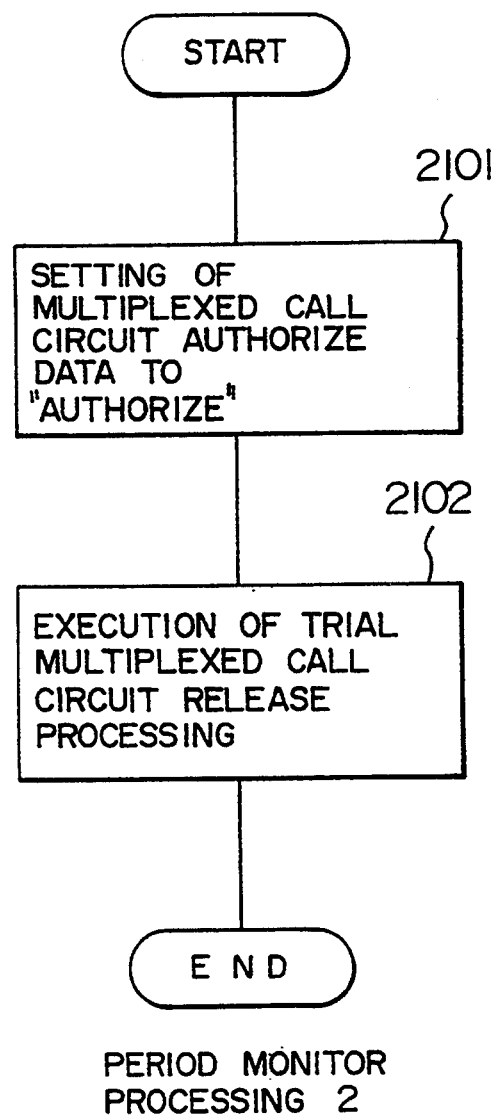
FIG. 21 is a flow chart for illustrating a period monitoring processing (2) involved in the procedure shown in FIG. 19.

FIG. 21 is a flow chart illustrating in detail the period monitoring processing 2 (1910) shown in FIG. 19. When it is recognized that the multiplexed call circuit has been set up, then the multiplexed call circuit set-up unauthorize data set at the step 1702 in the multiplexed call circuit set-up abandon processing in FIG. 17 is cleared to be replaced by the multiplexed call circuit set-up authorize data (step 2101, FIG. 21). Thereafter, a command is issued for releasing the multiplexed call circuit for the test or trial purpose (step 2102, FIG. 21).

According to the embodiment of the invention described above, the voice calls and data calls of different data rate can be multiplexed on a single B-channel of the ISDN circuit having the transmission rate of 64 kbps, whereby the circuit can be utilized very effectively. Further, unless the to-be-multiplexed call is present, the ISDN circuit is released, whereby the fruitless charging can be excluded.

Next, referring to FIGS. 22 and 23, description will be made in more detail of the call control information transmit/receive circuits 7a-6 and 7b-6 incorporated, respectively, in the multiplexing/demultiplexing units 7a and 7b shown in FIG. 2.

Figure 22:
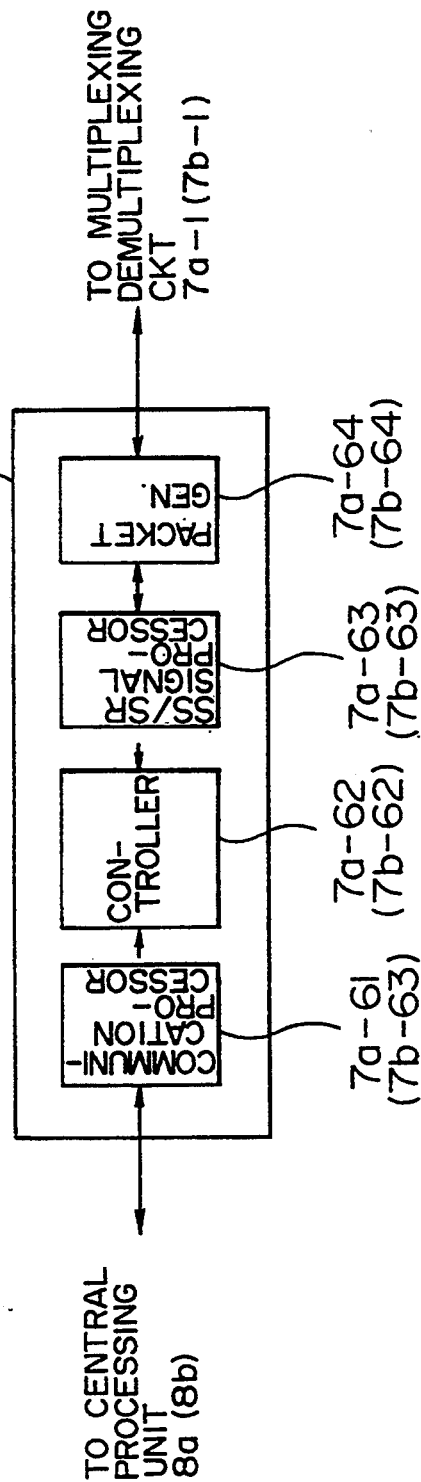
FIG. 22 is a functional block diagram showing call control signal transmit/receive circuit.

Referring to FIG. 22, the call control signal transmit/receive circuit 7a-6 (7b-6) comprises a communication processor 7a-61 (7b-61) for conducting communication with the central processing unit 8a (8b) shown in FIG. 2, a controller 7a-62 (7b-62), a SS/SR signal processor 7a-63 (7b-63), and a packet generator 7a-64 (7b-64) serving as interface for the multiplexing/demultiplexing circuit 7a-1 (7b-1) shown in FIG. 2.

Operations of the various parts of the call control information transmit/receive circuit mentioned above will be described on the assumption that the call control signals for every multiplexed ports 7a-5 (7b-5) are to be transmitted to the paired PBXs.

The call control signal generation request issued to the multiplexed ports 7a-5 from the central processing unit 8a (8b) is transmitted to the communication processor 7a-61 (7b-61) and hence to the controller 7a-62 (7b-62). The controller 7a-62 (7b-62) then makes decision as to which of the multiplexed ports 7a-5 (7b-5) the request is issued to, the result of the decision being supplied to the SS/SR signal processor 7a-63 (7b-63). In the SS/SR signal processor 7a-63 (7b-63), the call control signal is placed at a bit position of the SS/SR signal which corresponds to the multiplexed port 7a-5 (7b-5) of concern, the resulting signal being then transferred to the packet generator 7a-64 (7b-64), whereby the SS/SR signal is converted to a packet by using a frame of a 8-byte length, which packet is then supplied to the multiplexing/demultiplexing circuit 7a-1 (7b-1) for transmitting the call control signal at a transmission rate of 8 kbps.

On the other hand, when the call control signal is received, processing reverse to that described above is performed, whereby the call control information for each of the multiplexed ports 7a-5 (7b-5) is sent to the central processing unit 8a (8b).

Figure 23:
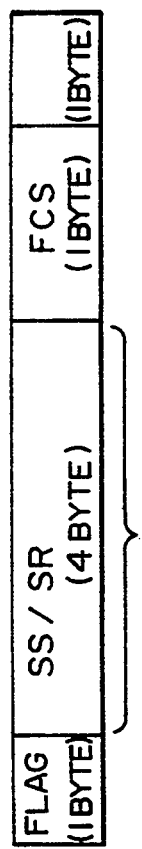
FIG. 23 is a view showing a frame structure of a call control information packet.

FIG. 23 is a view showing a frame structure of the call control information packet used between the paired PBXs. In the figure, the numerals affixed to the bits A are in one-to-one correspondence with the multiplexed ports 7a-5 (7b-5).

In the foregoing description, it has been assumed that the multiplexing/demultiplexing unit 7a (7b) is implemented in one independent unit, as shown in FIG. 2. It should however be understood that the multiplexing/demultiplexing unit may equally be realized in separate structure. By way of example, the selector circuit 7a-4 (7b-4) shown in FIG. 2 may be so arranged that it also serves as the switch network 3a (3b) with the ADPCM circuit 7a-3 (7b-3) being implemented separately, wherein connection may be made from the telephone interface 5a (5b) to the switch network 3a (3b), the ADPCM circuit 7a-3 (7b-3), the switch network 3a (3b), the multiplexing/demultiplexing circuit 7a-1 (7b-1) and to the switch network 3a (3b)-ISDN trunk 6a (6b). In this case, for the data communication, connection may be made from the data terminal interface 4a (4b) to the switch network 3a (3b), the bit extracting circuit 7a-2 (7b-2), the multiplexing/demultiplexing circuit 7a-1 (7b-1), the switch network 3a (3b), and to the ISDN trunk 6a (6b).

What is claimed is:

1. A method of conducting multiplexed communication between first and second exchanges, comprising steps of:

detecting occurrence of a call which is compressible from said first exchange to said second exchange;

setting up a circuit between multiplexing ports of said first and second exchanges;

transferring call control information via said circuit set between said first and second exchanges for controlling said call between said first and second exchanges after said circuit has been set up;

connecting said call to multiplexed ports of said exchanges through multiplexing/demultiplexing means interposed between said multiplexing ports and said multiplexed ports for interconnection thereof;

connecting any other compressible call occurring after said call to said multiplexed ports;

upon detection that all the calls connected to said multiplexed ports have been cleared, releasing the circuit between said multiplexing ports of said first and second exchanges;

starting a count of time by time measuring means when said circuit between said multiplexing ports of said first and second exchanges is set-up;

checking whether a call exists on said circuit when said time measuring means counts up to a predetermined time; and releasing said circuit when no call exists on said circuit and resetting the count in said time measuring means when a call exists on said circuit.

2. A method of conducting multiplexed communication between first and second exchanges, comprising steps of:

detecting occurrence of a compressible call from said first exchange to said second exchange;

setting up a circuit between multiplexing ports of said first and second exchanges;

transferring call control information via said circuit set between said exchanges for controlling said call after said circuit has been set up;

connecting said call to multiplexed ports of said exchanges through multiplexing/demultiplexing means interposed between said multiplexing ports and said multiplexed ports for interconnection thereof;

connecting any other compressible call occurring after said call to said multiplexed ports;

starting a count of time by time measuring means when said circuit between said multiplexing ports of said first and second exchanges is set-up;

checking whether a call exists on said circuit when said time measuring means counts up a predetermined time: and releasing said circuit when no call exists on said circuit or restarting the count in said time measuring means when a call exists on said circuit;

starting a count of time by said time measuring means when the circuit failed to be set-up between said multiplexing ports;

connecting any other compressible call occurring subsequently between the exchanges by using an alternative route: and trying again a circuit set-up between said multiplexing ports after lapse of a predetermined time;

wherein when the circuit set-up succeeds, call connection is realized by using said multiplexing/demultiplexing means for compressible calls occurring thereafter between the exchanges.

3. A multiplexed communication system for multiplexed communication between a plurality of exchanges, comprising at each exchange:

multiplexing/demultiplexing means for compressing and multiplexing data inputted from first input/output ports to thereby output compressed and multiplexed data to second input/output ports and for demultiplexing and expanding data inputted from said second input/output ports to thereby output demultiplexed and expanded data to said first input/output ports;

call control information messaging means for messaging control information for controlling calls between said exchanges;

first detection means for detecting an occurrence of a compressible call to be connected to said first input/output ports;

means for, upon detection of a compressible call by said first detection means, setting up a circuit through an ISDN exchange network between said exchanges to interconnect said second input/output ports of said multiplexing/demultiplexing means, said call control information messaging means transferring control information through said circuit for controlling said compressible call to thereby connect said compressible call to said first input/output ports between said exchanges;

second detection means for detecting whether all calls connected to said first input/output ports have been cleared;

means for, upon detecting that all the calls connected to said first input/output ports have been cleared, releasing said circuit through said ISDN exchange network between said exchanges; and time measuring means for measuring a time duration of a communication between said exchanges when said circuit is setup between said exchanges and for checking whether a call exist on said circuit, said time measuring means is reset when upon checking it is determined that a call exists on said circuit and said circuit is released when upon checking it is determined that a call does not exist on said circuit.

4. A system for multiplexed communication between a plurality of exchanges, comprising at each exchange:

multiplexing/demultiplexing means for compressing and multiplexing data inputted from first input/output ports to thereby output compressed and multiplexed data to second input/output ports and for demultiplexing and expanding data inputted from said second input/output ports to thereby output demultiplexed and expanded data to said first input/output ports;

call control information messaging means for messaging control information to control calls between said exchanges;

first detection means for detecting an occurrence of a compressible call to be connected to said first input/output ports;

means for, upon detection of a compressible call by said first detection means, setting up a circuit between said exchanges to interconnect said second input/output ports of said multiplexing/demultiplexing means, said call control information messaging means transferring control information through said circuit for controlling said compressible call to thereby connect said compressible call to said first input/output ports between said exchanges;

second detection means for detecting whether all calls connected to said first input/output ports have been cleared; and means for, upon detecting that all the calls connected to said first input/output ports have been cleared, releasing said circuit between said exchanges;

wherein at each exchange said system further comprises:

a first time measuring means for measuring a time duration of a communication between said exchanges when said circuit is setup between said exchanges and for checking whether a call exist on said circuit, said first time measuring means is reset when upon checking it is determined that a call exists on said circuit and said circuit is released when upon checking it is determined that a call does not exist on said circuit;

wherein when the circuit between the exchange has not been set up, a second time measuring means is started and circuit setup for interconnecting said multiplexing/demultiplexing means is tried after a time duration measured by said second time measuring means has attained a predetermined time, and said second time measuring means is reset it the circuit between the exchanges has not been set up.

* * * * *